US006333627B1

(12) United States Patent
Nishikawa

(10) Patent No.: US 6,333,627 B1
(45) Date of Patent: Dec. 25, 2001

(54) APPARATUS FOR MEASURING A PROFILE OF AN ELECTRON BEAM OF A CRT

(75) Inventor: Yoshihiro Nishikawa, Kobe (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/032,998

(22) Filed: Mar. 2, 1998

(30) Foreign Application Priority Data

Mar. 2, 1997 (JP) .................................................. 9-048013

(51) Int. Cl.[7] ............................ G01R 13/20; G01R 1/04; H04N 17/00

(52) U.S. Cl. .................................. 324/121 R; 324/158.1; 348/189

(58) Field of Search ............................... 324/121 R, 404, 324/158.1, 408; 348/189, 191; 356/121

(56) References Cited

U.S. PATENT DOCUMENTS 4,364,079 * 12/1982 Pons .................................... 348/191
4,408,163 * 10/1983 Burr et al. .......................... 324/404
4,536,792 * 8/1985 Harshbarger ........................ 324/404
4,593,309 * 6/1986 Uno et al. ........................... 348/191
4,602,272 * 7/1986 Duschl ................................ 324/404
4,989,072 * 1/1991 Sato et al. ........................... 324/404
5,049,791 * 9/1991 Kawakami ........................... 348/191
5,440,340 * 8/1995 Tsurutani et al. .................... 348/190
5,835,135 * 11/1998 Hamaguri et al. ................... 348/191

FOREIGN PATENT DOCUMENTS 6-162933 6/1994 (JP) .
8-203436 8/1996 (JP) .

* cited by examiner

*Primary Examiner*—Safet Metjahic
*Assistant Examiner*—Jermele M. Hollington
(74) *Attorney, Agent, or Firm*—Burns, Doane, Swecker & Mathis, LLP

(57) ABSTRACT

An apparatus for measuring a profile of an electron beam of a CRT includes a test pattern generator which generates a test pattern having a plurality of separate luminous images on a fluorescent surface of the CRT, and an image pickup device which picks up the plurality of separate luminous images in a single pickup operation. Positions of phosphors defining one luminous image are made to be relatively different from those of phosphors defining another luminous image. The apparatus is provided with a relative position calculator for calculating respective relative positions of phosphors defining each luminous image, and a beam profile calculator for calculating a profile of an electron beam of the CRT based on outputted pixel data and calculated relative positions.

40 Claims, 22 Drawing Sheets

1
6
62
1ST DRIVE CONTROL
2ND DRIVE CONTROL
63
614
613
615
61
612
Bm
611
CCD CAMERA
3
PIXEL SIGNAL
5
52
KEYBOARD
DISPLAY DEVICE
53
51
CONTROLLER
2
DATA INPUT CONTROLLER
RASTER SIZE SIGNAL
BEAM SIGNAL
4
SIGNAL GENERATOR

CCD CAMERA
PIXEL SIGNAL
2
21
A/D CONVERTER
22
V RAM
23
ROM
24
RAM
25
CONTROLLER
26
DELAY CKT
27
V SIGNAL DETECTOR
28
COMMUNICATION UNIT
4
SIGNAL GENERATOR
CRT
BEAM SIGNAL
RASTER SIZE SIGNAL
CRT
DRIVE SIGNAL
CCD CAMERA
MEASUREMENT CONTROLLER

Pv
G
B
R
d
Bm

APPARATUS FOR MEASURING A PROFILE OF AN ELECTRON BEAM OF A CRT

This application is based on patent application No. 9-48013 filed in Japan, the contents of which is hereby incorporated by reference.

BACKGROUND OF THE INVENTION

This invention relates to an apparatus for measuring a profile of an electron beam projected onto a display surface of a cathode ray tube (hereinafter, referred to as "CRT") equipped with a shadow mask, or a distribution of electron energy density on a CRT display surface.

Conventionally, a method for measuring the profile of an electron beam has been proposed as a method for highly accurately and quantitatively evaluating the focusing performance of a color CRT.

This method for measuring the profile of an electron beam is basically such that electron beams having a specified electron energy are projected onto phosphors, thereby converting them into light energy and this light energy is sensed by being photoelectrically converted into an electric energy by an image pickup device such as a CCD (Charge Coupled Device), and the profile of the electron beam is quantitatively measured using pixel data obtained by the image pickup device.

However, in the color CRT equipped with a shadow mask, phosphors of three primary colors of red (R), green (G), blue (B) are discretely and regularly applied to the display surface, and only parts of the electron beams are caused to transmit by the shadow mask to make specified phosphors luminous. Accordingly, even if a spot of electron beam is projected in a specific position of the CRT display surface, thereby making a phosphor luminous so that this phosphor is sensed by the image pickup device, a data (luminance information in a plurality of positions within the section of the beam) cannot be obtained in sufficient quantity to specify the profile of the electron beam.

In view of the above problem, there has been proposed a method according to which phosphors are made luminous in a plurality of positions within the section of an electron beam quantitatively measuring the profile of the electron beam using pixel data obtained by sensing the luminous phosphors by the image pickup device.

For example, U.S. Pat. No. 4,408,163 discloses an electron beam profile measuring apparatus in which the position of a projected electron on a single specific phosphor is finely displaced along vertical and horizontal directions, the luminous phosphor is sensed in the respective projection positions, and the profile of the electron beam is calculated using the relative luminous position and luminance of the phosphors within the electron beam in the respective projection positions.

Further, Japanese Unexamined Patent Publication No. 8-203436 discloses an electron beam profile measuring apparatus in which the positions of a projected electron beam on a plurality of specific phosphors are finely displaced along vertical and horizontal directions, the plurality of luminous phosphors are sensed in each projected position, and the profile of the electron beam is calculated using the relative luminous positions and luminances of the plurality of phosphors within the electron beam in the respective projection positions.

The above prior art measuring apparatus disadvantageously requires a long time for the measurement since the data necessary for the calculation of the profile of the electron beam is obtained by finely displacing the projection position of the single electron beam along vertical and horizontal directions with respect to the specific phosphors and repeatedly sensing the phosphor in each projection position.

Assuming, for example, that the sectional profile of the electron beam on the CRT display surface is a circle of the diameter of 1 mm, resolving power in the measurement of the profile of the beam is 40 $\mu$m, and the interval of the phosphors of the CRT equipped with a shadow mask is 0.28 mm, it is necessary to repeat the sensing about 625 times ($=1/(0.04)^2$) by finely displacing the electron beam along vertical and horizontal directions with respect to the specific phosphors in the measuring apparatus of U.S. Pat. No. 4,408,163 while it is necessary to repeat the sensing about 49 times ($=0.28/(0.04)^2$) by finely displacing the electron beam along vertical and horizontal directions with respect to the specific group of phosphors in the measuring apparatus of Japanese Unexamined Patent Publication No. 8-203436.

In order to repeat the sensing a plurality of times, high stability is required during the measurement. For example, the blurring of the sensed image due to a vibration during the measurement may cause a measurement error.

SUMMARY OF THE INVENTION

It is an object of the present invention to provide an apparatus and a method for measuring the profile of an electron beam which has overcome the problems residing in the prior art.

It is another object of the present invention to provide an apparatus and a method for evaluating the performance of a CRT which has overcome the problems residing in the prior art.

According to an aspect of the present invention, an apparatus for measuring a profile of an electron beam of a CRT, comprises: a test pattern generator which controls an electron gun device of a CRT to produce a test pattern having a plurality of separate luminous images on a fluorescent surface of the CRT, positions of phosphors defining one luminous image being relatively different from those of phosphors defining another luminous image; an image pickup device which picks up the plurality of separate luminous images in a single pickup operation to output pixel data in accordance with a luminance of phosphors defining each luminous image; a relative position calculator which calculates respective relative positions of phosphors defining each luminous image; and a beam profile calculator which calculates a profile of an electron beam of the CRT based on outputted pixel data and calculated relative positions.

According to another aspect of the present invention, an apparatus for evaluating a performance of a CRT, comprises: a test pattern generator which controls an electron gun device of a CRT to produce a test pattern having a plurality of separate luminous images on a fluorescent surface of the CRT, positions of phosphors defining one luminous image being relatively different from those of phosphors defining another luminous image; an image pickup device which picks up the plurality of separate luminous images in a single pickup operation to output pixel data in accordance with a luminance of phosphors defining each luminous image; a relative position calculator which calculates respective relative positions of phosphors defining each luminous image; and a calculator which calculates an energy density distribution of an electron beam of the CRT based on outputted pixel data and calculated relative positions.

According to another aspect of the present invention, an apparatus for measuring a profile of an electron beam of a CRT, comprises: a test pattern generator which controls an electron gun device of a CRT to produce a test pattern having a plurality of separate luminous images on a fluorescent surface of the CRT, positions of phosphors defining one luminous image being relatively different from those of phosphors defining another luminous image; an image pickup device which picks up the plurality of separate luminous images in a single pickup operation to output pixel data in accordance with a luminance of phosphors defining each luminous image; a relative position calculator which calculates respective relative positions of phosphors defining each luminous image based on outputted pixel data; and a beam profile calculator which calculates a profile of an electron beam of the CRT based on outputted pixel data and calculated relative positions.

According to another aspect of the present invention, a method for measuring a profile of an electron beam of a CRT, comprises the steps: producing a test pattern having a plurality of separate luminous images on a fluorescent surface of a CRT, positions of phosphors defining one luminous image being relatively different from those of phosphors defining another luminous image; picking up the plurality of separate luminous images in a single pickup operation to generate pixel data in accordance with a luminance of phosphors defining each luminous image; calculating respective relative positions of phosphors defining each luminous image; and calculating a profile of an electron beam of the CRT based on generated pixel data and calculated relative positions.

According to another aspect of the present invention, a method for evaluating a performance of a CRT, comprises the steps of: producing a test pattern having a plurality of separate luminous images on a fluorescent surface of the CRT, positions of phosphors defining one luminous image being relatively different from those of phosphors defining another luminous image; picking up the plurality of separate luminous images in a single pickup operation to generate pixel data in accordance with a luminance of phosphors defining each luminous image; calculating respective relative positions of phosphors defining each luminous image; and calculating an energy density distribution of an electron beam of the CRT based on generated pixel data and calculated relative positions.

These and other objects, features and advantages of the present invention will become more apparent upon a reading of the following detailed description and accompanying drawings.

BRIEF DESCRIPTION OF THE DRAWINGS

FIGS. 1A to 1C are diagrams showing the principle of the measurement of the profiles of electron beams, wherein FIG. 1A shows a state where phosphors are made luminous by projecting a plurality of electron beams at specified intervals of pixels on the display surface of a CRT equipped with an aperture grill, FIG. 1B shows a luminance distribution of a plurality of luminous phosphors included in each electron beam, and FIG. 1C shows a state where the profiles of the electron beams are calculated by combining the luminance distributions obtained for the respective electron beams;

FIGS. 6A and 6B are diagrams showing a calculation processing of a correction coefficient $\eta$, wherein FIG. 6A shows the luminous state of the phosphors on the display surface of the CRT when all green phosphors are made luminous, and FIG. 6B shows a distribution of energy of the electron beam along vertical direction in vertical scanning;

FIGS. 7A to 7C are diagrams showing distributions of energy of the electron beam along vertical direction in the CRT display for the calculation of the correction coefficient, wherein FIG. 7A shows a distribution of energy during the first raster scanning, FIG. 7B shows a distribution of energy during the second raster scanning, and FIG. 7C shows a distribution of energy along vertical direction projected onto phosphors when raster scanning is performed a specified number of times;

FIGS. 11A to 11C are diagram showing a method for calculating the interval between the phosphors, wherein FIG. 11A shows an image of stripe pattern obtained by sensing the CRT display surface entirely made luminous by a single color, FIG. 11B shows a signal obtained by extracting pixel data on a specific horizontal line, and FIG. 11C shows a pulse train signal obtained by applying a binary processing to the signal of FIG. 11B;

FIGS. 13A and 13B are diagrams showing a processing of measuring the profile of the electron beam, wherein FIG. 13A shows a state where a test pattern is displayed by discretely projecting a plurality of electron beams at specified intervals and FIG. 13B shows the luminance level of the luminous phosphors detected for each beam;

FIGS. 22A and 22B are diagrams showing a processing of measuring a profile of the vertical line, wherein FIG. 22A shows a test pattern including a plurality of vertical lines and FIG. 22B shows a relationship between the electron beam density and the phosphor position on the display surface of the color CRT;

DETAILED DESCRIPTION OF THE PREFERRED EMBODIMENTS OF THE INVENTION

An electron beam profile measuring apparatus according to the invention is described with reference to the accompanying drawings.

First, the summary of the principle of measuring the profile of an electron beam is briefly described with reference to FIG. 1, taking a color CRT equipped with an aperture grill as an example.

Figure 1A:
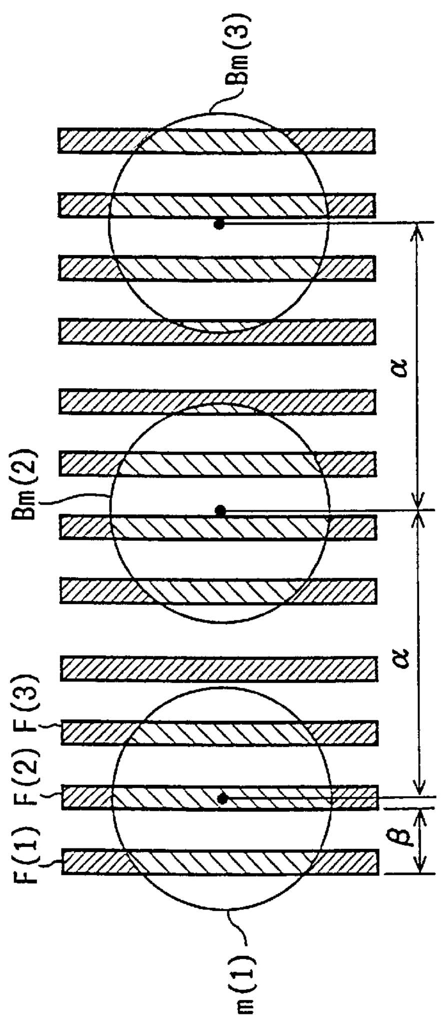
Figure 1B:
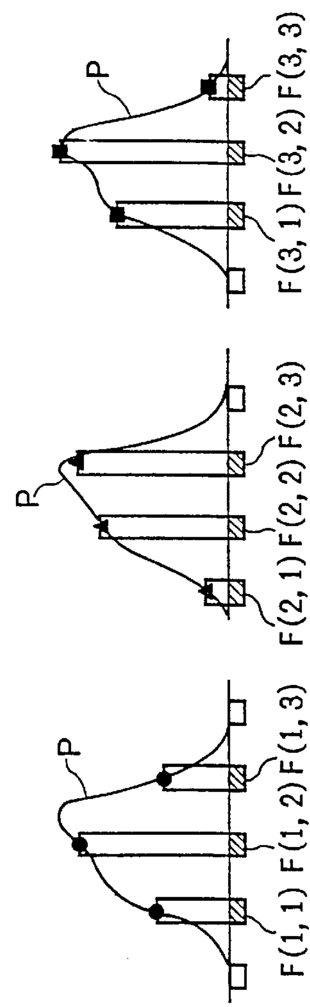
Figure 1C:
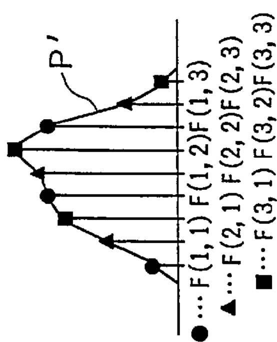

FIG. 1A shows a state where a plurality of phosphors F(j) (j=1, 2, . . . ) are made luminous by projecting a plurality of electron beams Bm(i) (i=1, 2, 3) on a display surface of the CRT. FIG. 1B shows luminance distributions of a plurality of phosphors F(i, k) made luminous by the respective electron beams Bm(i). FIG. 1C shows the calculated profile of the electron beams by combining the luminance distributions obtained for the respective electron beams Bm(1) to Bm(3).

In FIG. 1A, hatched portions represent luminous portions. In FIGS. 1B and 1C, P, P' represent the actual profile of the electron beam and the measured profile of the electron beam. Further, the phosphor F(i, k) is the k-th one of the phosphors made luminous by the electron beam Bm(i) from the left within the beam.

According to the inventive method for measuring the profile of an electron beam, a specified test pattern of such a raster size that an interval $\alpha$ of the electron beams Bm(i) (i=1, 2, . . . ) and an interval $\beta$ of the phosphors F(j) have a relationship: $\alpha$=k (non-integer). $\beta$ as shown in FIG. 1A is first displayed on the display surface of the CRT. In other words, the test pattern is displayed by changing the raster size such that the horizontal stripe patterns formed within the beams by the luminous phosphors differ from each other and by making the phosphors luminous by discretely projecting the electron beams so that they do not overlap each other.

Next, this test pattern is sensed only once by a CCD camera and the relative positions (X-coordinates along horizontal direction defined in the beam) of the phosphors F(i, k) made luminous by each electron beam Bm(i) within this beam and a luminance distribution are calculated from the sensed image as shown in FIG. 1B. Since the stripe patterns formed by the luminous phosphors and fallen within the respective beams Bm(1) to Bm(3) differ, the luminance distributions calculated for the respective electron beams Bm(i) are distributions plotted by the X-coordinates different from each other.

Subsequently, as shown in FIG. 1C, the profile of the electron beams is calculated by combining the luminance distributions calculated for the electron beams Bm(1) to Bm(3). Specifically, the profile P' of the electron beams is calculated by combining the luminance distribution obtained in the phosphors F(1,1) to F(1,3) made luminous by t he electron beam Bm(1), the one obtained in the phosphors F(2,1) to F(2,3) made luminous by the electron beam Bm(2) and the one obtained in the phosphors F(3,1) to F(3,3) made luminous by the electron beam Bm(3) in the positions of the X-coordinates defined within the beams (the luminance distributions are combined in the order of F(1,1), F(2,1), F(3,1), F(1,2), F(2,2), F(3,2), F(1,3), F(2,3), F(3,3) from the left).

Figure 2:
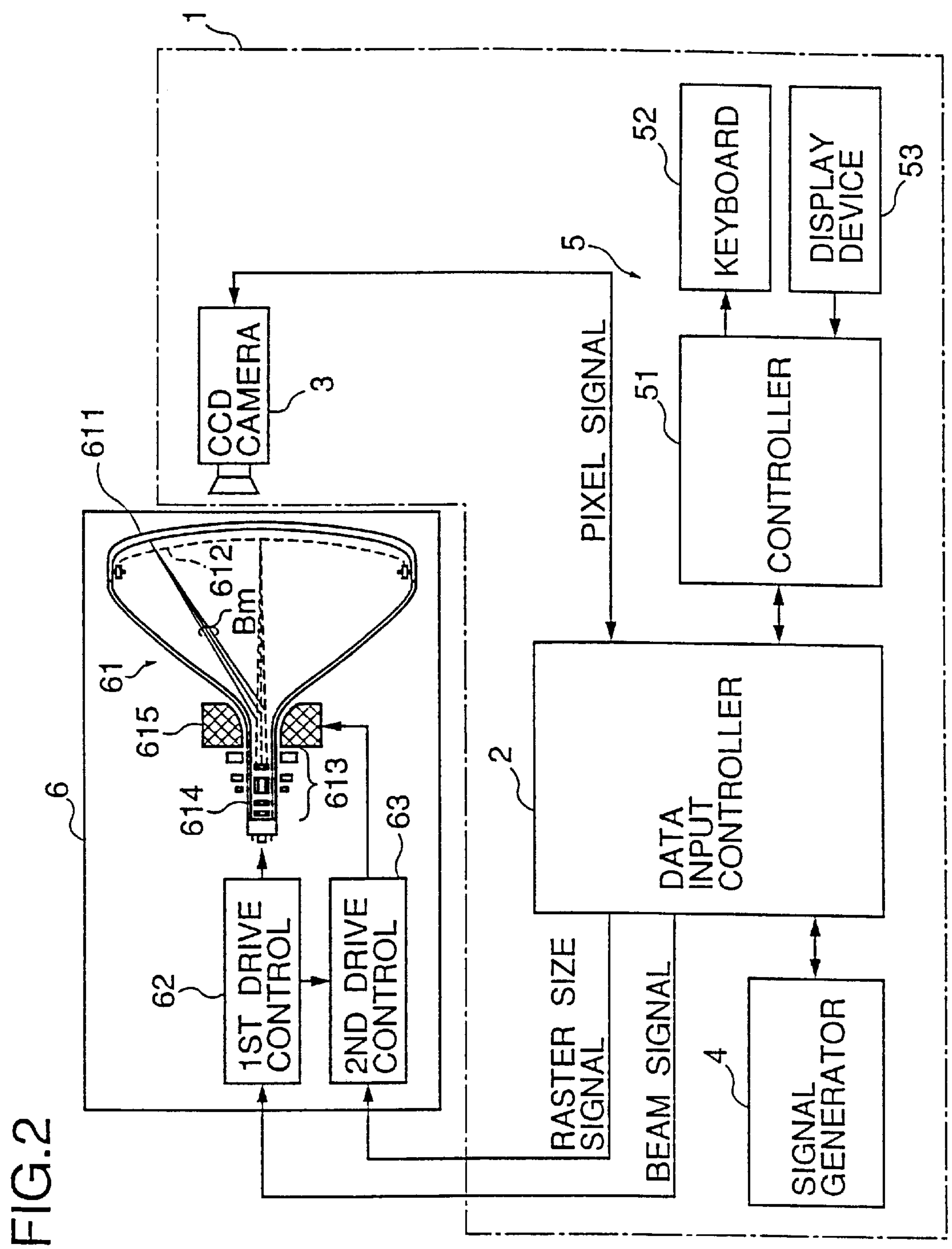
FIG. 2 is a block diagram showing a construction of a system for measuring an electron beam profile of a color CRT.

FIG. 2 is a block diagram showing a construction of a system for measuring a profile of an electron beam of a color CRT.

An electron beam profile measuring apparatus 1 comprises a data input controller 2, a CCD camera 3, a signal generator 4 and a measurement controller 5. The CCD camera 3, the signal generator 4 and the measurement controller 5 are connected with the data input controller 2 via unillustrated cables, respectively. The data input controller 2 is so connected with the measurement controller 5 as to be communicable therewith. The electron beam profile measuring system is constructed by connecting a color CRT 6 as an object to be measured with the data input controller 2 via an unillustrated cable.

The CCD camera 3 is adapted to detect the luminance of the phosphors arranged on the display surface of the color CRT 6 when being made luminous by the projection of the electron beams. The CCD camera 3 includes an image pickup device 31 (see FIG. 4) comprising a monochromatic CCD area sensor and a taking lens having a fixed focus for focusing a pattern image displayed on the display surface of the color CRT 6 on a sensing surface of the image pickup device 31. The CCD camera 3 performs an exposure control in conformity with a desired shutter speed by controlling the electric charge storing time of the image pickup device 31 (hereinafter, "CCD 31").

Figure 4:
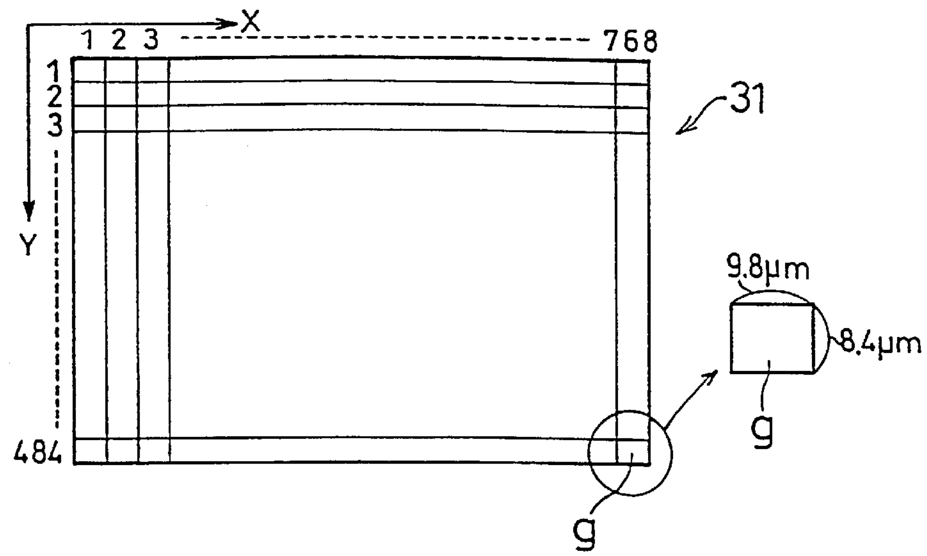
FIG. 4 is a diagram showing an arrangement of pixels of a CCD (Charge Coupled Device) of an image pickup device.

The CCD 31 is an area sensor such that, for example, 768 (horizontal)×484 (vertical) pixels g are arranged in a two-dimensional matrix as shown in FIG. 4. One pixel g has a size of, e.g., (8.4 $\mu$m (horizontal)×9.8 $\mu$m(vertical)).

The color CRT 6 to be measured which is shown in FIG. 2 is a color CRT of electromagnetic deflection type which includes a color cathode ray tube 61 for displaying an image, a first drive control circuit 62 for controlling the drive concerning the displayed image on the color cathode ray tube 61, and a second drive control circuit 63 for controlling the drive concerning a display range (raster size) of the color cathode ray tube 61.

Figure 5:
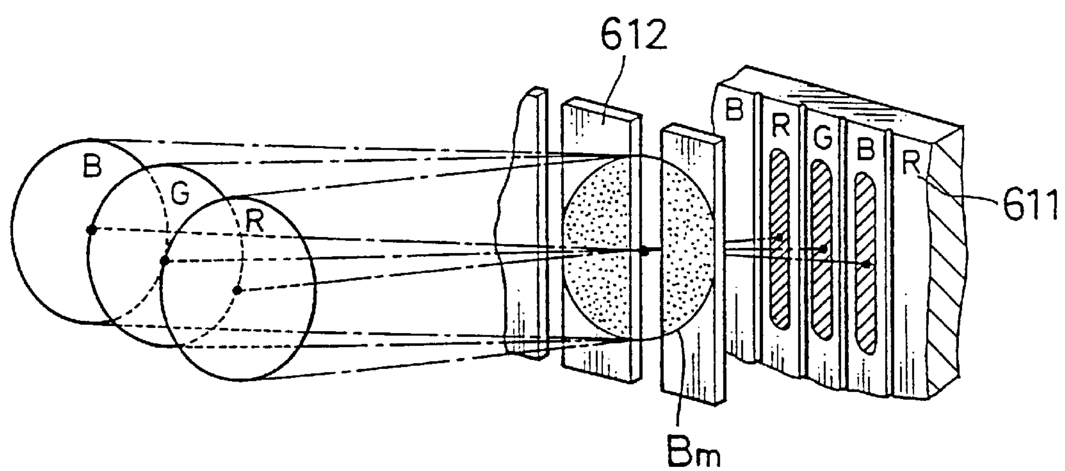
FIG. 5 is a perspective view showing an essential construction of a face plate of a CRT equipped with an aperture grill.

In the color cathode ray tube 61, as shown in FIG. 5, a fluorescent surface 611 is formed by adhering stripe phosphors $F_R$, $F_G$, $F_B$ of R, G, B regularly arranged along horizontal direction to the rear surface of a face plate. In front of the fluorescent surface of the cathode ray tube 61 is provided a stripe patterned aperture grill 612 at a specified distance. In an electron gun mount portion 613 are provided three electron guns 614 in conformity with the respective colors of R, G, B, and a deflection yoke 615 is provided outside the leading end of the electron gun mount portion 613.

The first drive control circuit 62 controls the profiles (sectional profiles of the beams and a density distribution of electron energy) of electron beams emitted from the electron guns 614 and corresponding to the respective colors R, G, B. The first drive control circuit 62 controls the drive of the electron guns 614 in accordance with a beam control signal (video signal) inputted from the data input controller 2.

The second drive control circuit 63 controls raster scanning and a scanning range (projection range) on the fluorescent surface 611 by the electron beams Bm. The second drive control circuit 63 controls the display positions of the electron beams Bm emitted from the electron guns 614 in accordance with a raster size control signal (deflection control signal) inputted from the data input controller 2.

The data input controller 2 controls the input of data necessary for the measurement of the profiles of the electron beams of the color CRT 6 and specifically controls the display on the color CRT 6 and the drive of the CCD camera 3. In measuring the profiles of the electron beams, a correction coefficient η used to correct the luminous efficiency of the phosphors and the raster size for displaying the specified test pattern for the measurement are determined in advance. The correction coefficient η is adapted to correct a luminous variation among the phosphors, and the setting of the raster size is equivalent to the setting of the interval α of FIG. 1A. The setting of the correction coefficient and the raster size corresponds to the calibration of the electron beam profile measuring apparatus.

The data input controller 2 controls the input of data for determining the correction coefficient η and the raster size and the display of the color CRT 6 in obtaining the data for the actual measurement of the profiles of the electron beams, and also controls the image pickup operation of the CCD camera 3 when the above data are obtained. The data input controller 2 calculates the correction coefficient η and the raster size using the image signal picked up by the CCD camera 3 and sends the calculation results to the measurement controller 5. Further, in the actual measurement of the profiles of the electron beams, a luminance distribution of the phosphors made luminance by each of a plurality of electron beams is calculated and this calculation result is sent to the measurement controller 5.

Figure 3:
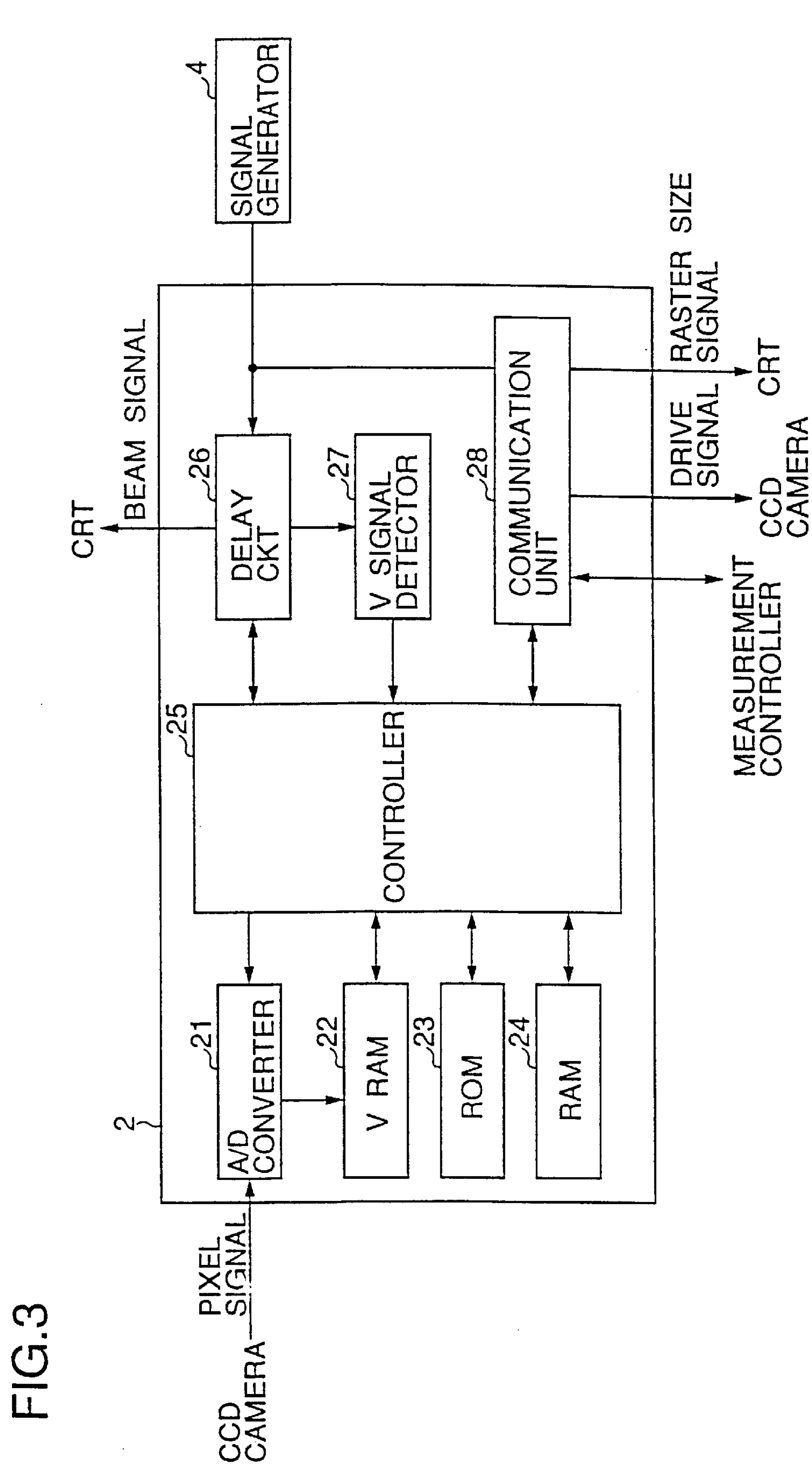
FIG. 3 is a block diagram showing a construction of a measurement controller of the electron beam profile measuring apparatus according to a first embodiment of the present invention.

FIG. 3 is a block construction diagram of the measurement controller of the electron beam profile measuring apparatus.

The data input controller 2 includes an analog-to-digital (A/D) converter 21, a VRAM (video random access memory) 22, a ROM (read only memory) 23, a RAM (random access memory) 24, a controller 25 including a microcomputer, a synchronization signal delay circuit 26, a vertical synchronization signal detector 27 and a communication unit 28.

The A/D converter 21 converts pixel signals (luminance signals obtained by the respective pixels of the CCD 31) sent from the CCD camera 3 into digital signals comprising, e.g., a 10-bit data. The VRAM 22 is a memory for storing the pixel signals converted into the digital signals by the A/D converter 21 (hereinafter, pixel data). The VRAM 22 has a storage capacity of storing a frame image picked up by the CCD 31. In this embodiment, the CCD 31 has (764×484) pixels and a frame image comprises (768(horizontal)×484 (vertical)) pixel data. Accordingly, the VRAM 22 has a storage capacity of storing the (764×484) 10-bit pixel data.

The ROM 23 is a memory in which a control program for the measurement of the profiles of the electron beams is stored. The RAM 24 provides a storage area (work area) when a series of calculations are performed in accordance with the above control program using the pixel data stored in the VRAM 22.

The controller 25 centrally controls the operation of each element of the data input controller 2, controls the display on the color CRT 6 and the pickup operation of the image data by the CCD camera 3 as well as the data communication with the measurement controller 5.

The synchronization signal delay circuit 26 delays a vertical synchronization signal of a pattern signal outputted from the signal generator 4 by a specified time designated by the controller 25. In the calculation of the correction coefficient η of the luminous efficiency, the luminous efficiencies of the respective phosphors need to be compared by projecting the electron beams of uniform energy onto the entire phosphors. However, in usual raster scanning, vertical scanning is performed at a vertical scanning interval Pv as described later. Accordingly, even if the display of the color CRT 6 is controlled by such a pattern signal as to make the entire fluorescent surface 511 luminous, the energy distribution of the electron beams varies at the vertical scanning intervals Pv of vertical direction, making it impossible to project the electron beams of uniform energy onto the entire phosphors.

The synchronization signal delay circuit 26 makes it possible to project electron beams whose energy distribution varies to a small degree along vertical direction onto the entire phosphors by delaying the vertical synchronization signal of the pattern signal for making the entire display surface of the color CRT 6 luminous and causing the raster scanning to be performed with the scanning start position of each field scanning displaced.

The vertical synchronization signal detector 27 detects the delayed vertical synchronization signal of the pattern signal. This detection signal is used for the exposure control of the CCD camera 3 since the luminous state of the phosphor is sensed at a timing when the phosphor located in the sensing position of the CCD 3 on the display surface of the color CRT 6 is made luminous.

The communication unit 28 controls the sending of drive control signals to the CCD camera 3 and the color CRT 6 and the data communication with the measurement controller 5.

Referring back to FIG. 2, the signal generator 4 generates the specified pattern signal (dot pattern) for the measurement which is displayed on the color CRT 6. The signal generator 4 generates the pattern signal by superimposing specified vertical and horizontal synchronization signals with an image signal representing the content of the pattern so as to enable the raster scanning of the specified display size standardized for the color CRT 6 by the electron beams Bm.

The measurement controller 5 includes a controller 51 comprising a personal computer, a keyboard 52 and a display device 53 such as a CRT, and is adapted to control the operation of the entire electron beam profile measuring apparatus, calculate the profile of the electron beams using the luminance distribution data calculated by the data input controller 2 and display the calculation result on the di splay device 53 if necessary.

In the above electron beam profile measuring apparatus 1, the profile of the election beam is measure d in the following procedure: (1) calculation of the correction coefficient η of the luminous efficiency of the phosphors; (2) display of the test pattern changed by changing the raster size; and (3) measurement of the profile of the electron beam.

The profiles of the electron beams of the respective colors R, G, B are measured substantially in the same manner. In the description below, the measurement of the profile of the beam is described taking the electron beam of green as an example.

First, the calculation of the correction coefficient $\eta$ of the luminous efficiency is described.

The correction coefficient $\eta$ of the luminous efficiency is designed to correct the variation of the luminous efficiency (conversion efficiency of electron energy into light energy) among the phosphors. With reference to the example of FIG. 1, if the luminous efficiency is assumed to be fixed in each phosphor F(j) in order to facilitate the explanation, the variation of the luminous efficiency to be considered is seen only between the stripe phosphors F(j). Assuming that K(j) denotes the luminous efficiency of the phosphor F(j) and the luminous efficiencies K(2), K(3), . . . of the phosphors F(2), F(3) are corrected on the basis of the luminous efficiency K(1) of the phosphor F(1), the correction coefficient $\eta(j)$ of each phosphor F(j) (j=2, 3, . . . ) is: $\eta(j)=K(1)/K(j)$.

Since the luminous efficiency K(i) of each phosphor F(j) is equivalent to an luminous amount L(i) when the electron beam of the same energy is projected, the correction coefficient $\eta(i)$ is calculated by $\eta(j)=L(1)/L(j)$ (j=2, 3, . . . ) in the calibration of the electron beam profile measuring apparatus 1.

If the luminous efficiency varies within each phosphor F(j), a plurality of measurement positions (X, Y) are set in each phosphor F(j) and the correction coefficients $\eta(X, Y)$ can be calculated by $\eta(X, Y)=L(X0, Y0)/L(X, Y)$ using luminous amounts L(X, Y) calculated in the respective measurement positions (X, Y). It should be noted that L(X0, Y0) denotes an luminous amount in a reference position (X0, Y0) for the calculation of the correction coefficient.

As described above, the electron beams Bm perform vertical scanning at the vertical scanning intervals Pv even if the display control of the color CRT 6 is performed by the pattern signal for making the entire fluorescent surface 611 luminous. Accordingly, the energy distribution of the electron beams Bm varies at the vertical scanning intervals Pv of vertical direction, with the result that uniform electron beams cannot be projected onto the entire phosphors.

Specifically, in the raster scanning for the CRT display, horizontal scanning is repeated at the vertical scanning interval Pv (>d) of vertical direction which is larger than a range d which is substantially on the same level as a peak value of the electron beam. The energy distribution of the raster-scanned electron beam Bm along vertical direction is pulsated as shown in FIG. 6B.

Figures 6A, 6B:
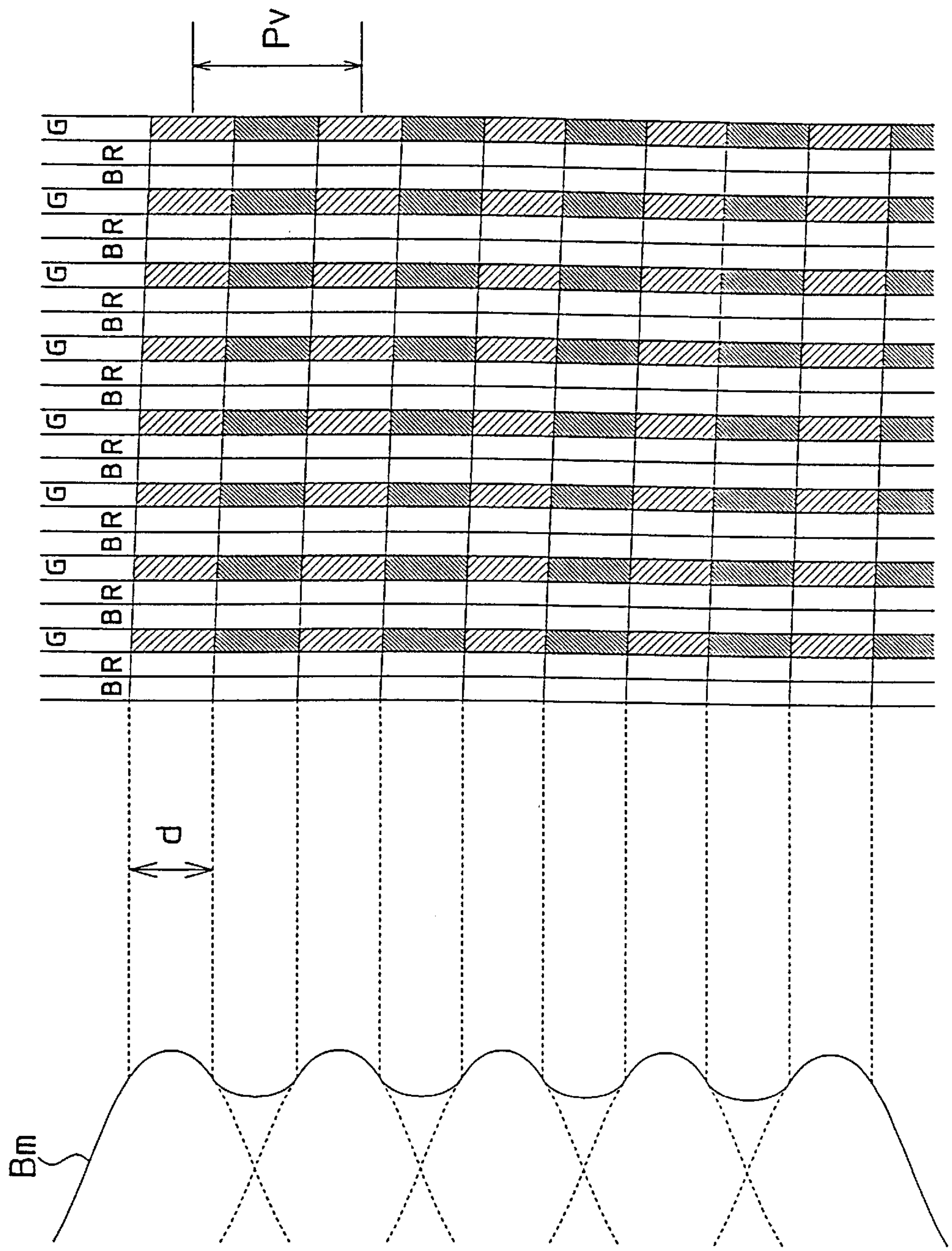

An image obtained by sensing the display surface of the color CRT 6 in this state is a stripe pattern of the luminance distribution corresponding to the vertical energy distribution of the electron beams Bm as shown in FIG. 6A. An accurate correction coefficient $\eta(j)$ cannot be calculated using the data of this sensed image.

FIG. 6A shows an image obtained by sensing the display surface of the color CRT 6 in which all green phosphors are made luminous, and FIG. 6B shows an energy distribution of the vertical electron beams in vertical scanning. Black portions (portion where concave portions of the energy distributions of the electron beams Bm are projected) of FIG. 6A are images of portions where green electron beams Bm are scanned, and hatched portions are images of portions at the valley of the vertical raster scanning.

Since the valley portions of the energy distributions of the electron beams Bm are projected on the valley portions of the vertical raster scanning as shown in FIG. 6B, the luminance is lower than in the black portions. Further, white portions are images of portions where the red and blue phosphors are applied and no phosphors are applied.

Figures 7A, 7B, 7C:
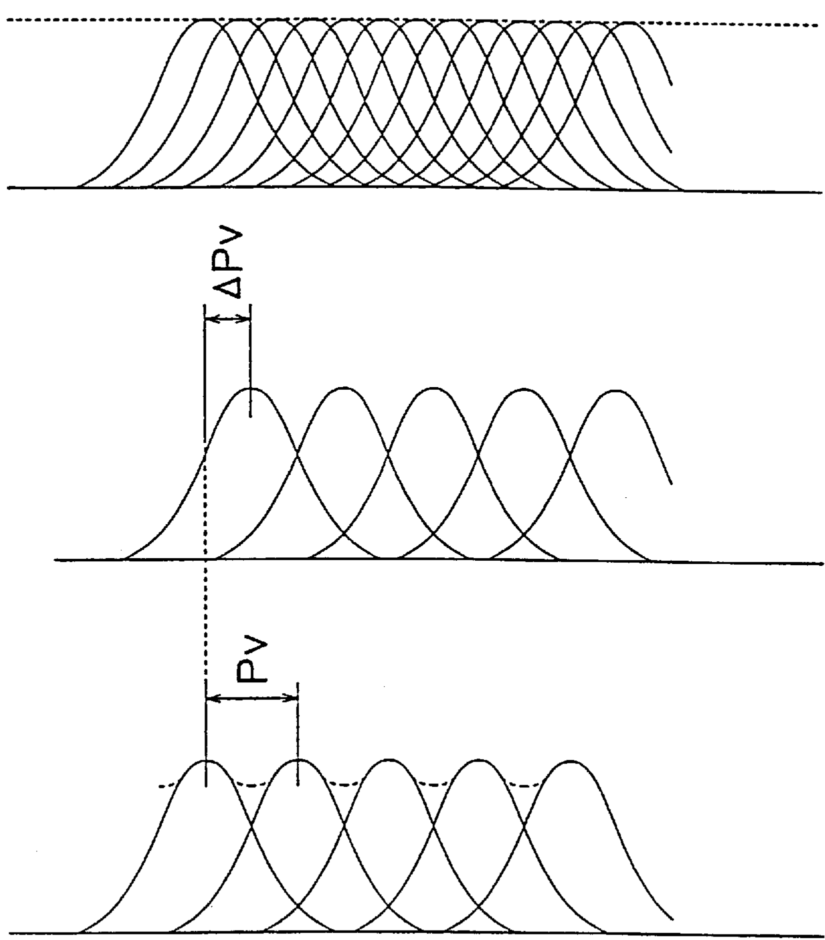

In this embodiment, the vertical raster scanning of the electron beams Bm is shifted every sub-line, so that energy is uniformly projected on the entire phosphors along vertical direction. Specifically, as shown in FIGS. 7A and 7B, the start position of one raster scanning is displaced from that of another raster scanning by a specified distance ΔPv (e.g., about Pv/10) so that maximum energy can be projected onto an area between consecutive sub-line raster scannings as shown in FIG. 7C.

If the green phosphors are made fully luminous by such vertical raster scanning, the luminous distributions of the green phosphors become uniform along vertical direction in FIG. 6A and an accurate correction coefficient $\eta(j)$ can be calculated based on the data of the sensed image.

Figure 8:
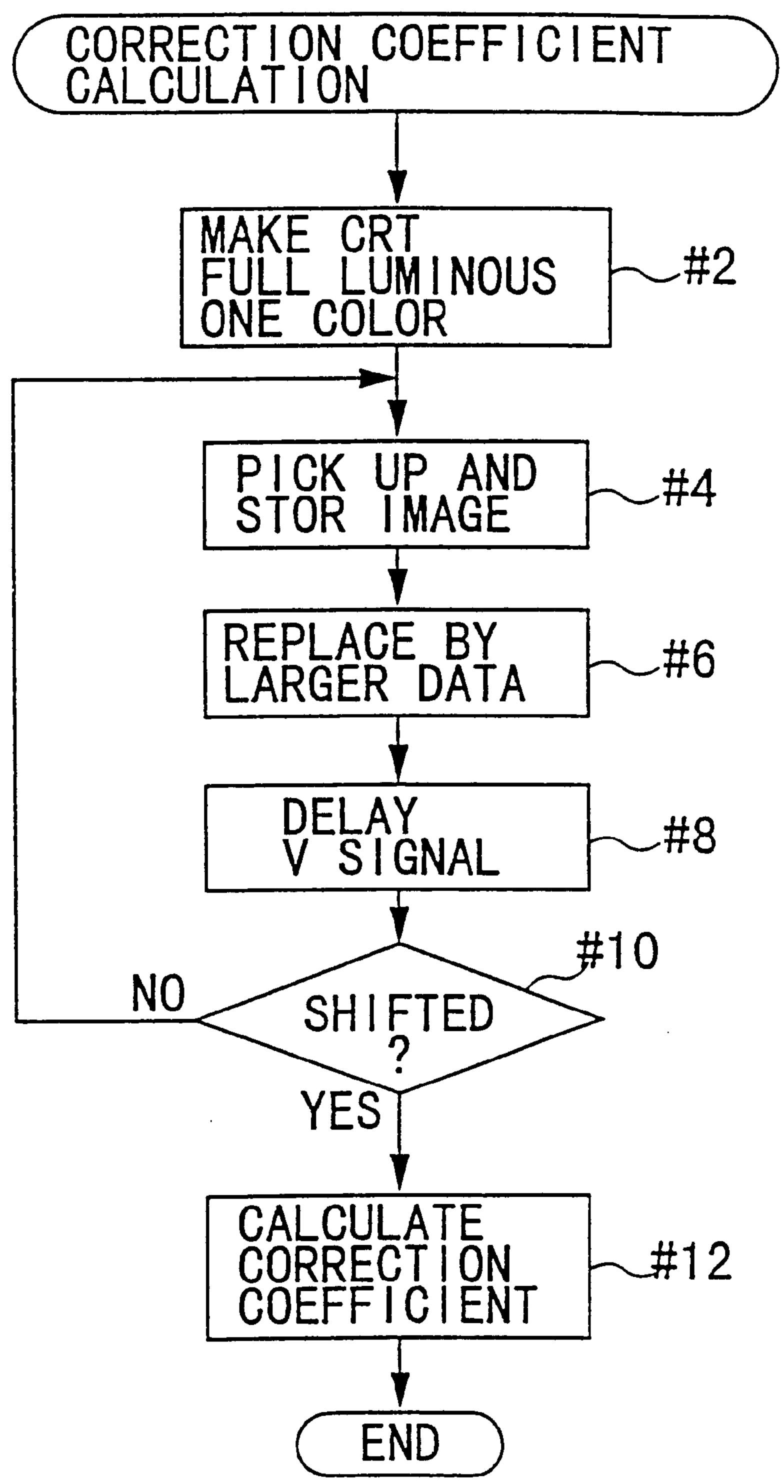
FIG. 8 is a flowchart showing a processing of calculating a correction coefficient of the luminous efficiency of the phosphor.

Next, with reference to a flowchart of FIG. 8, the calculation of the correction coefficient $\eta$ of the luminous efficiency is specifically described.

First, the phosphors of the color CRT 6 of one color are made fully luminous with the CCD camera 3 arranged in a specified position so as to face the display surface of the color CRT 6 (Step #2). For example, when the green phosphors are to be made fully luminous, the electron beams Bm corresponding to green from the electron gun 614 are swept over the entire display surface of the color CRT 6 at a specific energy intensity. The projection range of the electron beams Bm may be limited to the sensing range of the CCD camera 3.

Subsequently, in this displayed state, the image of the display surface of the color CRT 6 is picked up by driving the CCD camera 3. Pixel signal constituting this picked image are successively transferred to the data input controller 2, and are stored in the VRAM 22 after being converted into digital data of 10 bits in the A/D converter 21 (Step #4).

To the CCD camera 3 are inputted the vertical and horizontal synchronization signals from the data input controller 2. The image is picked up in synchronism with a timing when the electron beam Bm is swept over the sensing range of the CCD camera 3 (i.e., a timing when the phosphors in the sensing range are made luminous). As a result, an image as shown in FIG. 6A (image of stripe pattern) is picked up, and pixel signals constituting this picked image are successively transferred to the data input controller 2.

Subsequently, the pixel data stored in the VRAM 22 and those stored in RAM24 last time are compared, and the pixel data in the RAM24 are replaced by pixel data having larger levels (Step #6). Since "0" data are initially set in the RAM 24 during the first photographing, all pixel data stored in the VRAM 22 are transferred to the RAM24 as they are.

Subsequently, the vertical synchronization signal of the electron beam is delayed by a specified time Δtv (e.g., 2 $\mu$m) (Step #8). This delay time Δtv is a time corresponding to an interval at which the phosphors can be substantially continuously scanned along vertical direction at equal intensity, i.e., the sub-raster interval ΔPv in FIG. 7.

It is then discriminated whether the positions of the raster scanning of the electron beams have been shifted a predetermined number of times (Step #10). An area between the consecutive raster scannings is scanned the above number of times at the sub-raster intervals ΔPv. If the positions of the raster scanning of the electron beams have been shifted this number of times, it means that the electron beams of uniform energy have been projected on the entire surfaces of the green phosphors (see state of FIG. 7C).

In the first shifting processing, since the raster scanning positions have not yet been shifted the specified number of times (NO in Step #10), this routine returns to Step #4 to pick up a fully luminous image after the shifting of the raster scanning positions and to compare the pixel data constituting this picked image with the pixel data stored in the RAM24 so as to replace the pixel data in the RAM24 by the pixel data having higher levels (Steps #4, #6). In other words, the pixel data of maximum level are stored in the RAM24.

Steps #4, #6 are repeated while the vertical raster scanning positions of the electron beams are displaced by $\Delta Pv$ (Steps #4 to #10). After the raster scanning positions have been shifted the specified number of times (YES in Step #10), the collection of the data for the calculation of the correction coefficient $\eta$ is completed and the correction coefficients $\eta(j)$ of the respective phosphors are calculated using the respective pixel data stored in the RAM24 (maximum light reception data corresponding to the luminous amounts of the phosphors when the electron beam of the maximum energy is projected (Step #12) and this processing ends.

The correction coefficient $\eta(j)$ is calculated in the following manner using the pixel data having maximum light reception levels which are stored in the RAM24.

Figure 9:
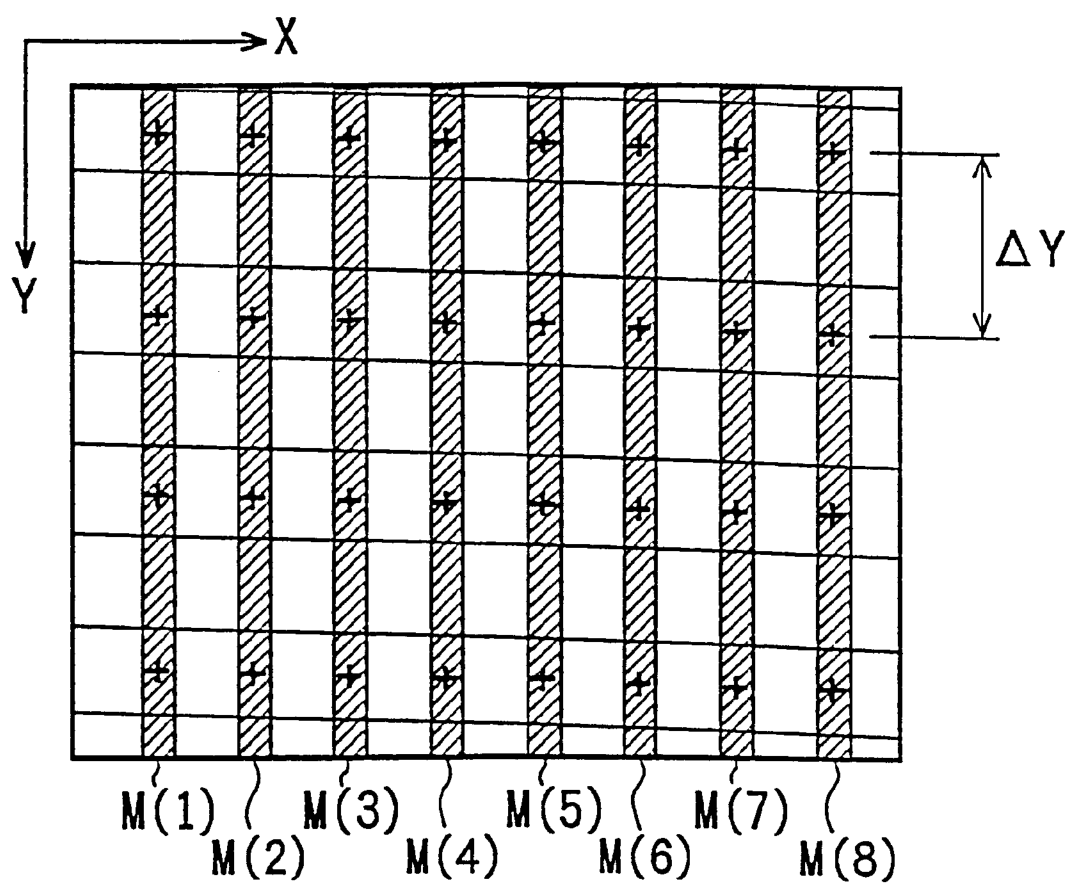
FIG. 9 is a diagram showing the stripe pattern of an image obtained by sensing the CRT display surface which is entirely made luminous by uniformly projecting energy.

FIG. 9 shows an image constituted by the pixel data having maximum light reception levels which are stored in the RAM24.

In FIG. 9, hatched portions are luminous portions of the green phosphors. Since the luminous portions M(1), M(2), . . . M(8) of the respective phosphors have fixed width and length, a plurality of luminance center positions are first calculated for each luminous portion M(j) of the phosphors in coordinate systems (X, Y) defined in the sensing surface. Assuming that X denotes an address (corresponding to the pixel position of the CCD 31) of each pixel data in the RAM24 and g(X) denotes the pixel data stored in the address X, the X-coordinate of the luminance center is calculated by $X=\Sigma X\cdot g(X)/\Sigma g(X)$. On the other hand, the Y-coordinates of the luminance centers are set at the fixed interval $\Delta Y$ (e.g., 40 $\mu$m). Positions indicated by + in FIG. 9 are luminance center positions calculated by the above calculation method and there are a total of 49 luminance center positions.

Next, the light reception level in each luminance center position (X, Y) is determined. The light reception level is determined by a sum Sm (X, Y) of the levels of, for example, (5×5) pixel data around the luminance center position (X, Y). The correction coefficients $\eta(X, Y)$ are calculated such that the light reception levels Sm(X, Y) in the respective luminance center positions (X, Y) are identical. For example, the correction coefficients $\eta(X, Y)$ in the respective luminance center positions (X, Y) are calculated by $\eta(X, Y)=Sm(X0, Y0)/Sm(X, Y)$, for example, based on the light reception level Sm (X0, Y0) in the luminance center position (X0, Y0).

Next, a processing of changing the raster size is described with reference to a flowchart of FIG. 10.

First, the phosphors of the color CRT 6 of the single color are made fully luminous with the CCD camera 3 located in such a position as to face the display surface of the color CRT 6 (Step #20). This is same as when the correction coefficient is calculated.

Subsequently, in this state, the image of the entire display surface of the color CRT 6 is picked up by driving the CCD camera 3 (Step #22) and the interval $\beta$ between the phosphors is calculated using this picked image data (Step #24).

Figure 10:
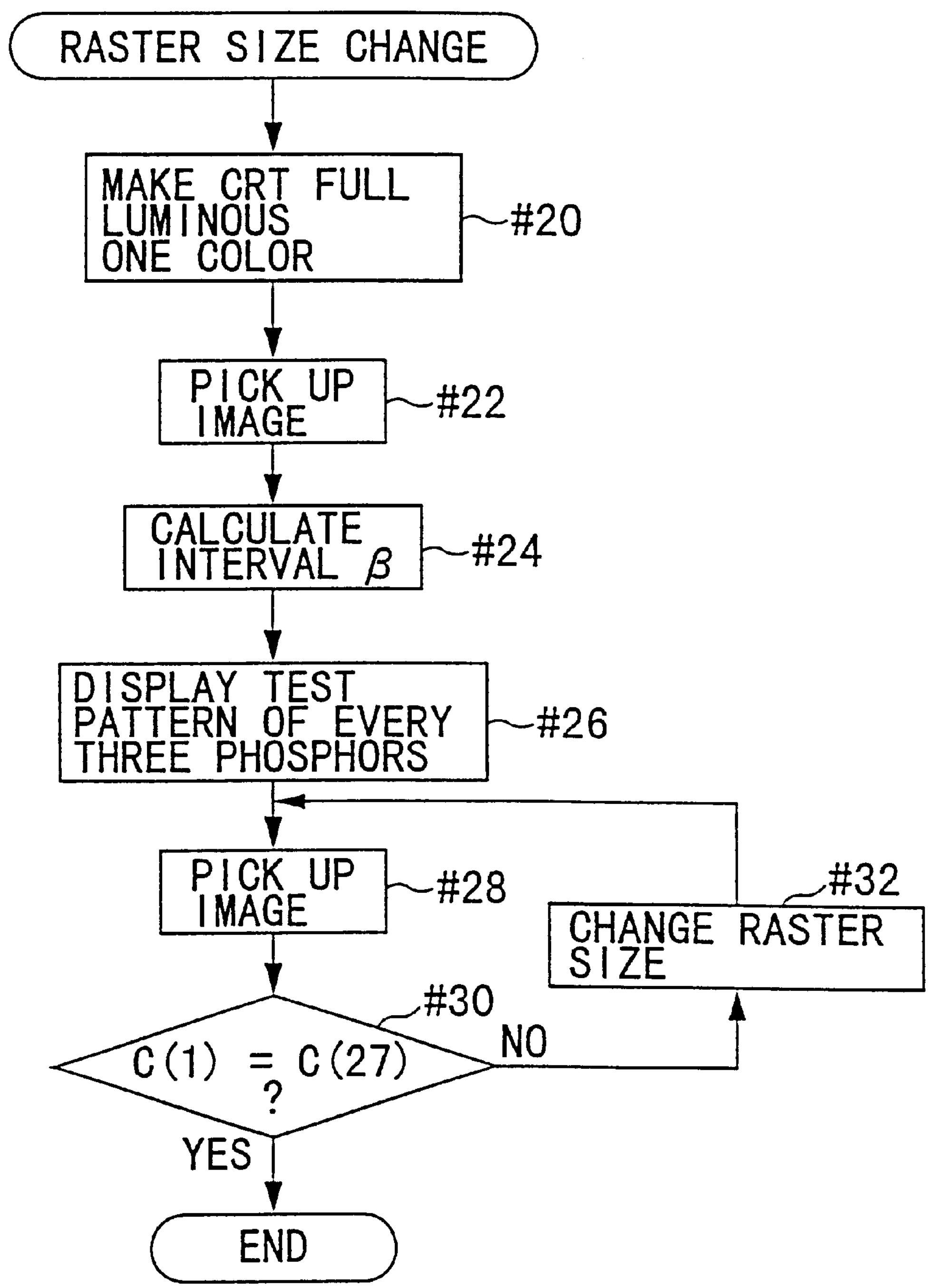
FIG. 10 is a flowchart showing a processing of changing a raster size.

Although the data is obtained again for the calculation of the phosphor interval $\beta$ in the flowchart of FIG. 10, the data used for the calculation of the correction coefficient $\eta$ (image data shown in FIG. 8) can also be used for the calculation of the phosphor interval $\beta$. Accordingly, if the phosphor interval $\beta$ is calculated using the pixel data stored in the RAM24 after the calculation of the correction coefficient $\eta$ is completed, the data obtaining process in Steps #20, #22 can be deleted.

The phosphor interval $\beta$ is calculated as follows using the pixel data obtained in the calculation of the correction coefficient $\eta$.

Figure 11A:
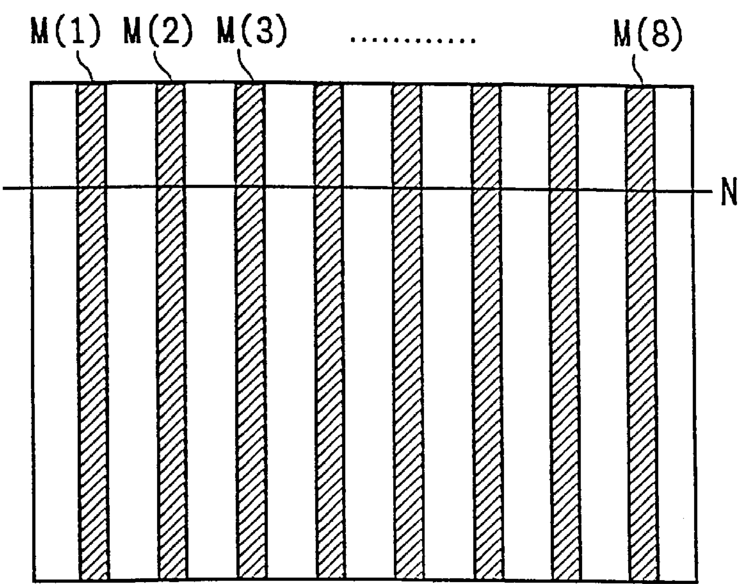

In the RAM24 are stored pixel data constituting the stripe pattern image shown in FIG. 11A. In FIG. 11A, vertical stripes M(1), M(2), . . . M(8) are images of luminous portions of the green phosphors.

Figure 11B:
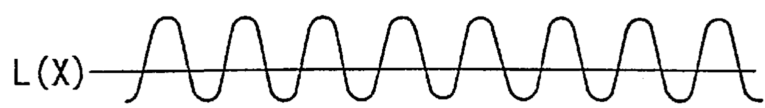

Out of these pixel data, those located on a specific horizontal line N of the stripe pattern image are extracted. A signal L(x) in which the level of the luminous portions shown in FIG. 11B is adjusted is obtained by multiplying the pixel data corresponding to the vertical stripes M(1), M(2), . . . M(8) by the corresponding correction coefficients $\eta(1)$, $\eta(2)$, . . . $\eta(8)$.

Figure 11C:
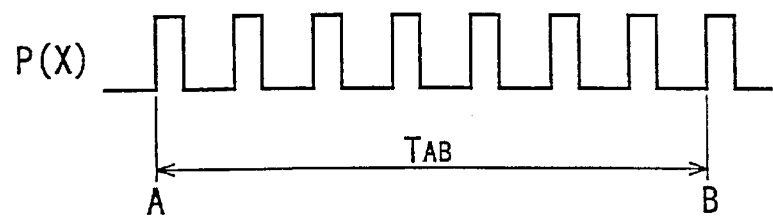

Further, binary processing is applied to the signal L(x) using a predetermined threshold level (e.g., 40% level) to obtain a pulse train signal P(x) shown in FIG. 11C. The pulse train signal P(x) has the same cycle as the stripe pattern as is clear from FIG. 11C. Accordingly, an interval $T_{AB}$ between points A and B of FIG. 11C is converted into a distance $d_{AB}$ on the sensing surface of the CCD 31, and this distance $d_{AB}$ is further converted into a distance $D_{AB}$ on the display surface of the color CRT 6 using a magnification $\beta 1$ of the taking lens.

The conversion of the interval $T_{AB}$ into the distance $d_{AB}$ is calculated by $d_{AB}=(n_B-n_A)\cdot p_H$ assuming that $n_A$, $n_B$ denote address numbers of the pixel data corresponding to the points A, B in the RAM24 and $p_H$ denotes the pixel interval of the CCD 31 along horizontal direction.

The conversion of the distance $d_{AB}$ into the distance $D_{AB}$ is calculated by $D_{AB}=d_{AB}/\beta 1$. Accordingly, the distance $D_{AB}$ is calculated by $D_{AB}=(n_B-n_A)\cdot p_H/\beta 1$-using the address numbers $n_A$, $n_B$, the pixel interval $p_H$ and the magnification $\beta 1$.

Assuming that the number of stripes included in the distance $D_{AB}$ is $N_{AB}$ (8 stripes in FIG. 11A), the phosphor interval $\beta$ is calculated by:

$$\beta=D_{AB}/N_{AB}=(n_B-n_A)\cdot p_H/(\beta 1\cdot N_{AB}).$$

Referring back to FIG. 10, the display of the color CRT 6 where the phosphors of one color are fully made luminous is changed to the test pattern image obtained by discretely projecting the electron beams every three phosphors along horizontal direction (Step #26). To discretely project the electron beams every three phosphors means to discretely project the electron beams Bm(1), Bm(2), . . . onto the phosphors F(1), F(4), . . . F(2r+1) (r=0, 1, . . . ) arranged every two other phosphors. The interval $\alpha$ between the beams is: $\alpha=3\beta$, and the center of each beam Bm(i) coincides with the center of the illuminated phosphor F(j). Accordingly, the stripe patterns formed by the luminous phosphors included in the respective beams Bm(i) are all identical.

The test pattern may be displayed on the entire display surface of the color CRT 6 or may be displayed on a partial area thereof including the sensing area of the CCD camera 3. Alternatively, the test pattern may be displayed for only one line.

Figure 13A:
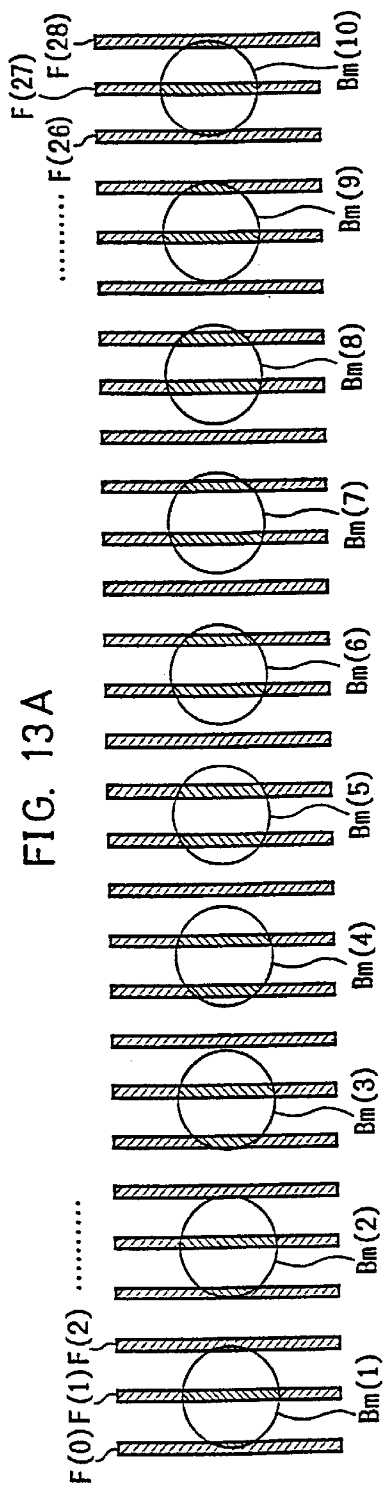

Subsequently, as shown in FIG. 13A, the raster size is changed along horizontal direction so that the stripe pattern formed by the luminous phosphors included in the electron beam Bm(1) coincides with the one formed by the luminous phosphors included in the electron beam Bm(10) (loop of Steps #28 to #32). In other words, the raster size is changed along horizontal direction so that there are 9 different kinds of stripe patterns included in the electron beams.

As described in the summary of the measurement principle, the luminance of the stripe pattern formed by the luminous phosphors within the section of the electron beam provides the energy density in the luminous positions in the section of the beam. Accordingly, the luminous positions within the section of the beam correspond to measurement points for specifying the profile of the electron beam. Thus, in the case of FIG. 12, since the stripe patterns included in the sections of the electron beams are all identical, there are three measurement points: $X1(=-\beta)$, $X2(=0)$ and $X3(=+\beta)$ if it is assumed that three stripes are included in each beam and the measurement points are expressed by X-coordinates defined in the center of the section of the beam.

To change the raster size so that 9 different kinds of stripe patterns are included in the sections of the beams means to increase the measurement points along horizontal direction ninefold to 27 (=3×9) by setting the beam interval $\alpha$: $\alpha<3\beta$.

If $\alpha<3\beta$, the projection position of the i-th electron beam Bm(i) (i=2, 3, . . . ) is displaced along horizontal direction by $\Delta d\cdot(i-1)$ (where $\Delta d=3\beta-\alpha$) as compared with the projection position before the change of the raster size. Accordingly, the measurement points within this beam are displaced by $\Delta d\cdot(i-1)$ (where $\Delta d=3\beta-\alpha$) as a whole. As a result, $X1=-\beta+\Delta d\cdot(i-1)$, $X2=+\Delta d\cdot(i-1)$, $X3=\beta+\Delta d\cdot(i-1)$.

The number of the measurement points increases as the change amount $\Delta d$ $(=3\beta-\alpha)$ of the beam interval $\alpha$ is made smaller, and the measurement accuracy becomes higher as the number of the measurement points increases. Thus, upon determining the number of the measurement points corresponding to a desired measurement accuracy, the change amount $\Delta d(=3\beta-\alpha)$ can be accordingly determined.

Figure 12:
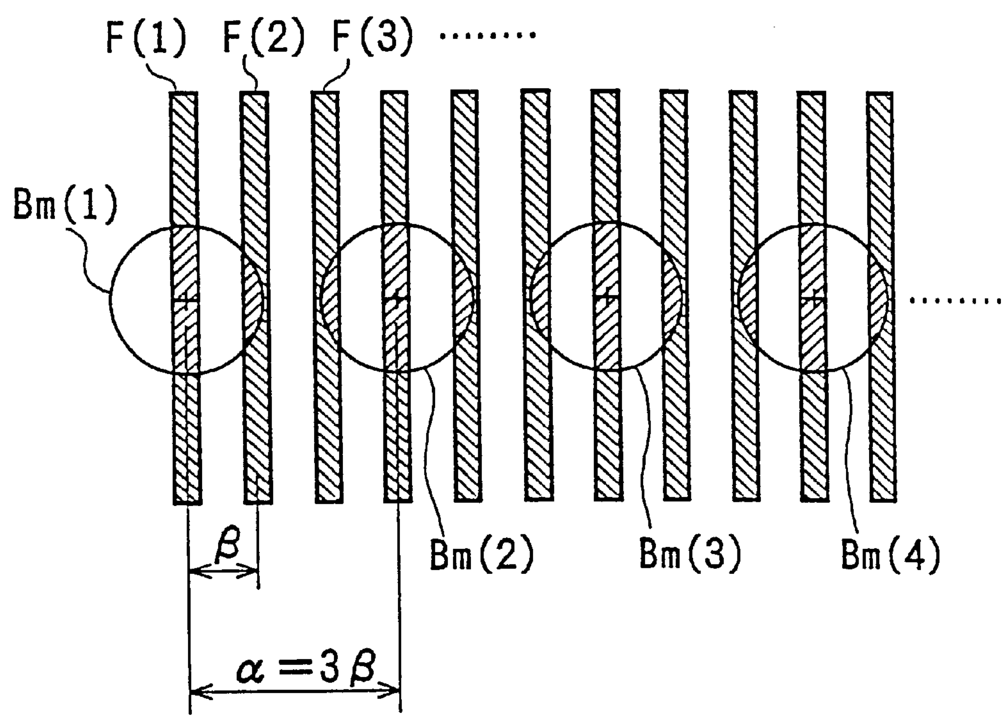
FIG. 12 is a diagram showing a state where electron beams are discretely projected at intervals of three phosphors along horizontal direction.

Now, if the profiles of the electron beams are measured based on the stripe pattern in n beam patterns different from each other assuming that the sections of the electron beams are dimensioned such that maximum three phosphors can be included therein, the raster size of the test pattern shown in FIG. 12 may be changed by setting the change amount $\Delta d$ such that the stripe pattern included in the first beam section and the stripe pattern included in the (n+1)th beam section are identical. At this time, since $\Delta d=\beta/n$, $$\alpha=3(1-\tfrac{1}{3}n)\cdot\beta$$

can be obtained by substituting $\Delta d$ by $\alpha=-\Delta d$. In this embodiment, since n=9, the beam interval $\alpha=2.89\beta=2.89\times 270=780$ $\mu$m if the phosphor interval $\beta$ is, for example, 70 $\mu$m.

Specifically, the raster size is changed in the following manner. The image of the test pattern is picked up for each field scanning (Step #28). Then, as shown in FIG. 13A, a luminance data C(1) of the phosphor F(1) on which the center of the electron beam Bm(1) is projected and a luminance data of the phosphor F(27) on which the center of the electron beam Bm(10) is projected are extracted. These extracted luminance data are compared after being corrected by the corresponding correction coefficients $\eta$ (Step #30).

Figure 13B:
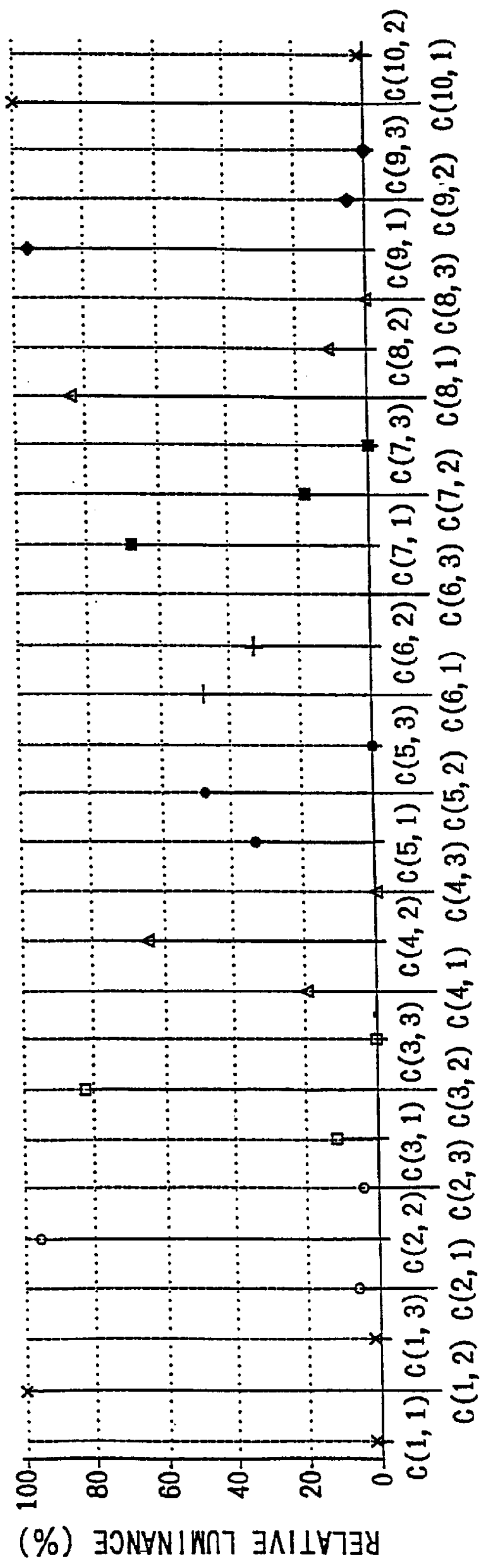

FIG. 13A shows a test pattern displayed on the color CRT 6 when the luminance data C(1) and C(27) agree with each other, only showing a portion where the electron beams Bm(1) to Bm(10) are projected. The black portions are portions of the phosphors F(0) to F(28) where the electron beams Bm(1) to Bm(10) are projected. FIG. 13B shows the luminance data C(0) to C(28) of the luminous positions (luminance centers) of the phosphors F(0) to F(28). In the calculation of the luminance data C(0) to C(28), the luminous efficiency is corrected by multiplying the pixel data corresponding to the luminous position and the correction coefficient $\eta$ corresponding to this position. Although normalized values are shown in FIG. 13B, normalization may not necessarily be performed in changing the raster size.

If the luminance data C(1) and C(27) are at variance (NO in Step #30), the next field scanning is performed after changing the raster size by a specified amount (Step #32). Then, the test pattern image is picked up and the luminance data C(1) and C(27) are compared again (Step #30). Hereafter, the raster size is changed while comparing the luminance data C(1) and C(27), and this processing is completed when the luminance data C(1) and C(27) are in agreement with each other (YES in Step #30).

Next, the measurement of the profile of the electron beam is described.

When the changing of the raster size is completed, the test pattern shown in FIG. 13A is displayed on the color CRT 6.

Figure 14:
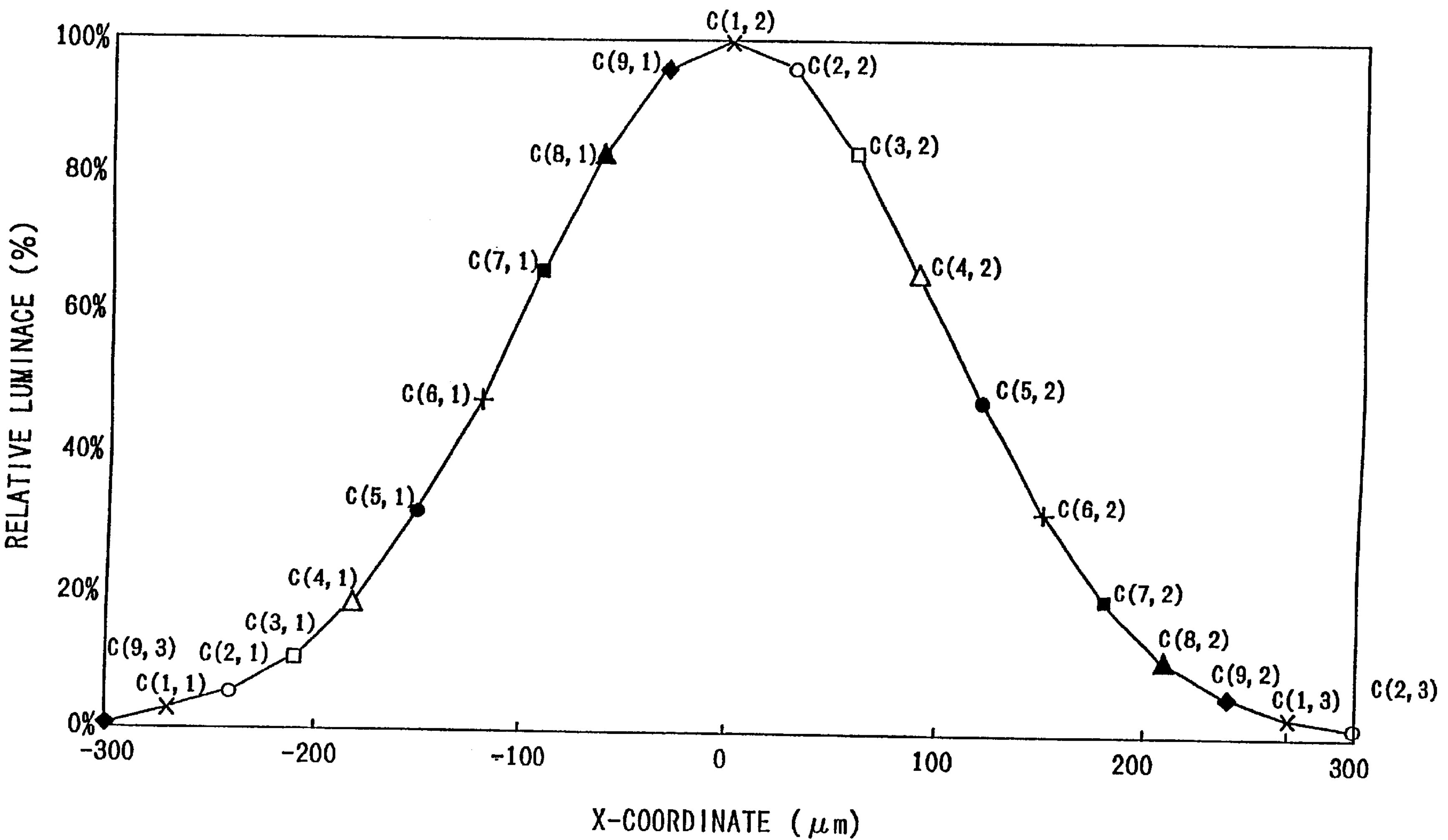
FIG. 14 is a diagram showing a measurement data representing the profile of the electron beam which is obtained by combining luminance data C(0) to C(26) shown in FIG. 13B.

This test pattern image is picked up by the CCD camera 3, and the luminance data C(0) to C(26) of the luminance positions of the respective phosphors F(0) to F(26) shown in FIG. 13B are calculated. A measurement data representing the profile of the electron beam shown in FIG. 14 is calculated by combining the luminance data C(0) to C(26).

The luminance data C(0) to C(26) are combined by rearranging the luminance data C(0) to C(26) in the luminous positions (X-coordinates) in the section of the electron beam. This combination processing may be performed by the data input controller 2 or by the measurement controller 5. In the combination processing of the luminance data C(0) to C(26), the luminous efficiency is corrected by multiplying the pixel data corresponding to the luminous position and the correction coefficient $\eta$ corresponding to the position.

Since the size of the section of the electron beam is such that the maximum three phosphors can be made luminous thereby, groups of three luminance data C(k) (k=0, 1, . . . 26) are corresponded to the electron beams Bm(i) (i=1, 2, . . . 9). If C(i, j) (j=1, 2, 3) denotes three luminance data corresponding to the electron beam Bm(i), i, j are determined: $i=\{\text{integer of }(k/3)\}+1$, $j=(k+1)-3(i-1)$.

If the luminous positions of the three luminance data C(i, j) corresponding to the electron beam Bm(i) within the section of the beam is expressed by X-coordinates $X_{i,j}$, the respective X-coordinates $X_{i,j}$ are: $X_{i,1}=-\beta+\Delta d\cdot(i-1)$, $X_{i,2}=+\Delta d\cdot(i-1)$, $X_{i,3}=\beta+\Delta d\cdot(i-1)$. However, if $\Delta d=3\beta-\alpha$ and $\beta=270$ $\mu$m, $\alpha=780$ $\mu$m and $\Delta d=30$ $\mu$m in the example of FIG. 13A.

Accordingly, the measurement data representing the profile of the electron beam is calculated by calculating the X-coordinates $X_{i,j}$ in the section of the electron beam corresponding to each luminance data C(i, j) and plotting the luminance data C(i, j) corresponding to the X-coordinates $X_{i,j}$. This measurement result is displayed on the display device of the measurement controller 5.

FIG. 14 shows the measurement data representing the profile of the electron beam obtained by combining the luminance data C(0) to C(26) shown in FIG. 13B. The resolving power of the measurement data is 30 $\mu$m and the displayed level is normalized relative level.

The test pattern for the measurement may be displayed in the entire sensing area of the CCD camera 3 or only dots necessary as the measurement data may be displayed. Alternatively, the measurement data of FIG. 14 representing the profile of the electron beam may be calculated based on the measurement data of only one line shown in FIG. 13A. Further alternatively, measurement data representing the profiles of a plurality of electron beams may be calculated based on the measurement data of a plurality of lines, and a final measurement data may be determined using this calculation result.

In this embodiment, the raster size on the display surface of the color CRT 6 is changed by sending the raster size control signal from the data input controller 2 to the color CRT 6. However, the raster size may be changed by delaying the video signal of the test pattern inputted from the signal generator 4 to the color CRT 6. According to this method, the raster size can be changed at a higher speed.

Figure 15:
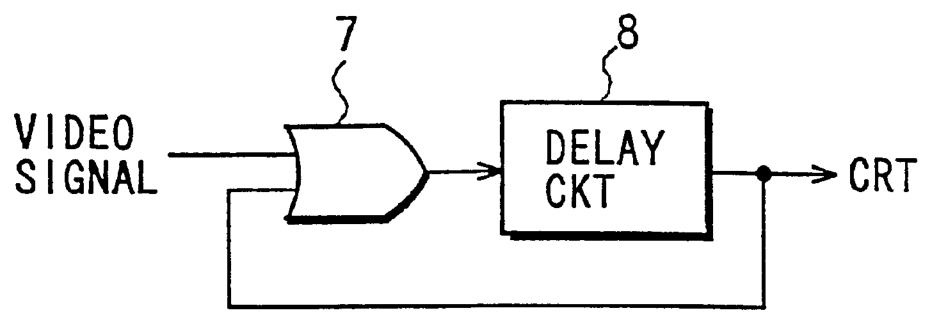
FIG. 15 is a diagram showing another circuit construction for changing the r aster size.
Figure 16:
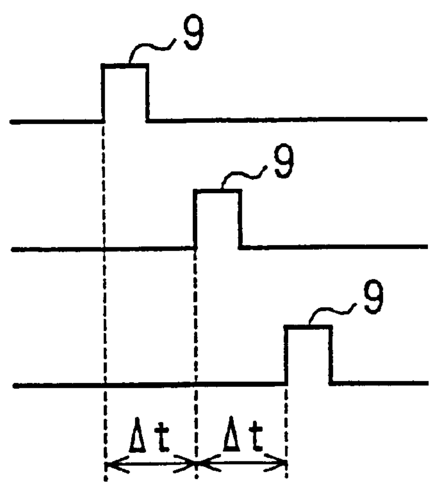
FIG. 16 is a chart showing an example of output signal of a delay circuit.

FIG. 15 is a series circuit of an OR circuit 7 and a delay circuit 8. A video signal outputted from the signal generator 4 is inputted to one of the input terminals of the OR circuit 7 and a video signal outputted from the delay circuit 8 is inputted to the color CRT 6. To the other input terminal of the OR circuit 7 is inputted a part of the output of the delay circuit 8. The delay circuit 8 is constructed such that a delay time $\Delta t$ is changeable. This delay time $\Delta t$ is controlled by, for example, the data input controller 2.

Video signals 9 of the test pattern which are outputted from the signal generator 4 are outputted to the color CRT 6 while being successively delayed by the predetermined time $\Delta t$ set in the delay circuit 8 by the series circuit of the OR circuit 7 and the delay circuit 8.

Although description is made on the measurement of the profile of the electron beam of the color CRT of the aperture grill type in this embodiment, the present invention can be likewise applied for the measurement of the profile of an electron beam of a color CRT of the dot mask type.

In the color CRT of the aperture grill type, since the measurement data for the calculation of the beam profile cannot be detected along horizontal direction, the raster size of the test pattern for the measurement is made changeable only along horizontal direction. However, in the color CRT of the dot mask type, the measurement data for the calculation of the beam profile can be detected both along horizontal direction and along vertical direction, the raster size of the test pattern for the measurement needs to be changed along both directions. In this case, assuming that $\beta x$, $\beta y$, $\alpha x$, $\alpha y$ denote phosphor interval along horizontal direction, phosphor interval along vertical direction, electron beam interval along horizontal direction and electron beam interval along vertical direction, the raster size is changed such that:

$$\alpha x = n(1-1/3n)\cdot\beta x$$

$$\alpha y = m(1-1/5m)\cdot\beta y.$$

It should be noted that n, m denote rates of increase by changing the raster size along horizontal and vertical directions, respectively.

Figure 17:
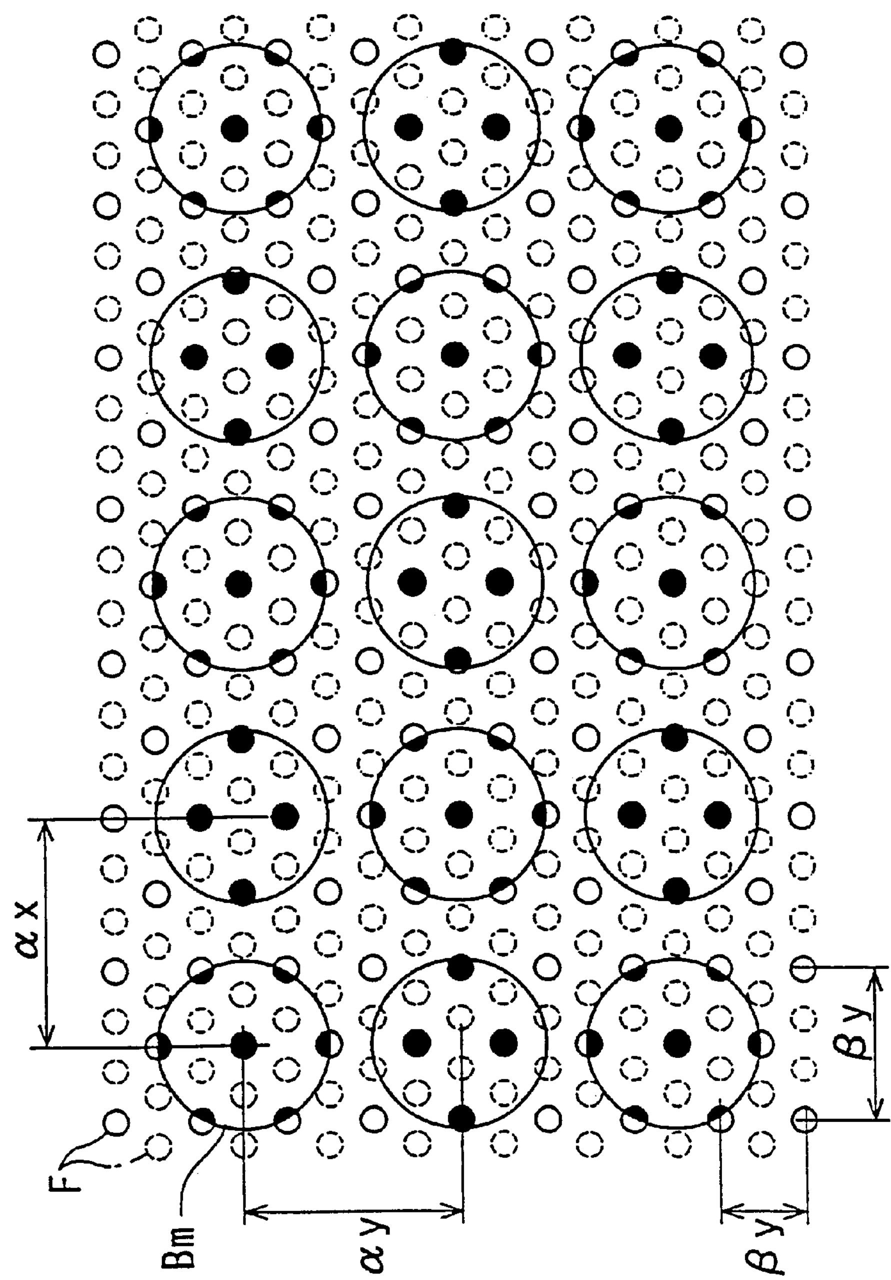
FIG. 17 is a diagram showing a state where electron beams are discretely projected at intervals of three phosphors along horizontal and vertical directions in a color CRT equipped with a shadow mask.

Now, assuming that the test pattern for the measurement is displayed by discretely projecting green electron beams at intervals of three phosphors ($3\beta x$) along horizontal direction and at intervals of five phosphors ($5\beta y$) along vertical direction as shown in FIG. 17, there are three horizontal measurement points and five vertical measurement points in this test pattern. In FIG. 17, large circles represent the electron beams Bm, whereas small circles represent the phosphors. Further, small circles in bold line represent green phosphors and black portions represent luminous portions.

If the raster size is so changed as to increase the horizontal measurement points to 27 and the vertical measurement points to 25, the rates of increase n, m of the measurement data are: n=27/3=9, m=25/5=5.

Accordingly, the raster size may be changed such that the horizontal beam interval $\alpha x$ is: $\alpha x=9(1-1/27)\cdot\beta x=2.89\beta x$ and the vertical beam interval $\alpha y$ is: $\alpha y=5(1-1/25)\cdot\beta x=4.8\beta x$.

Figure 18:
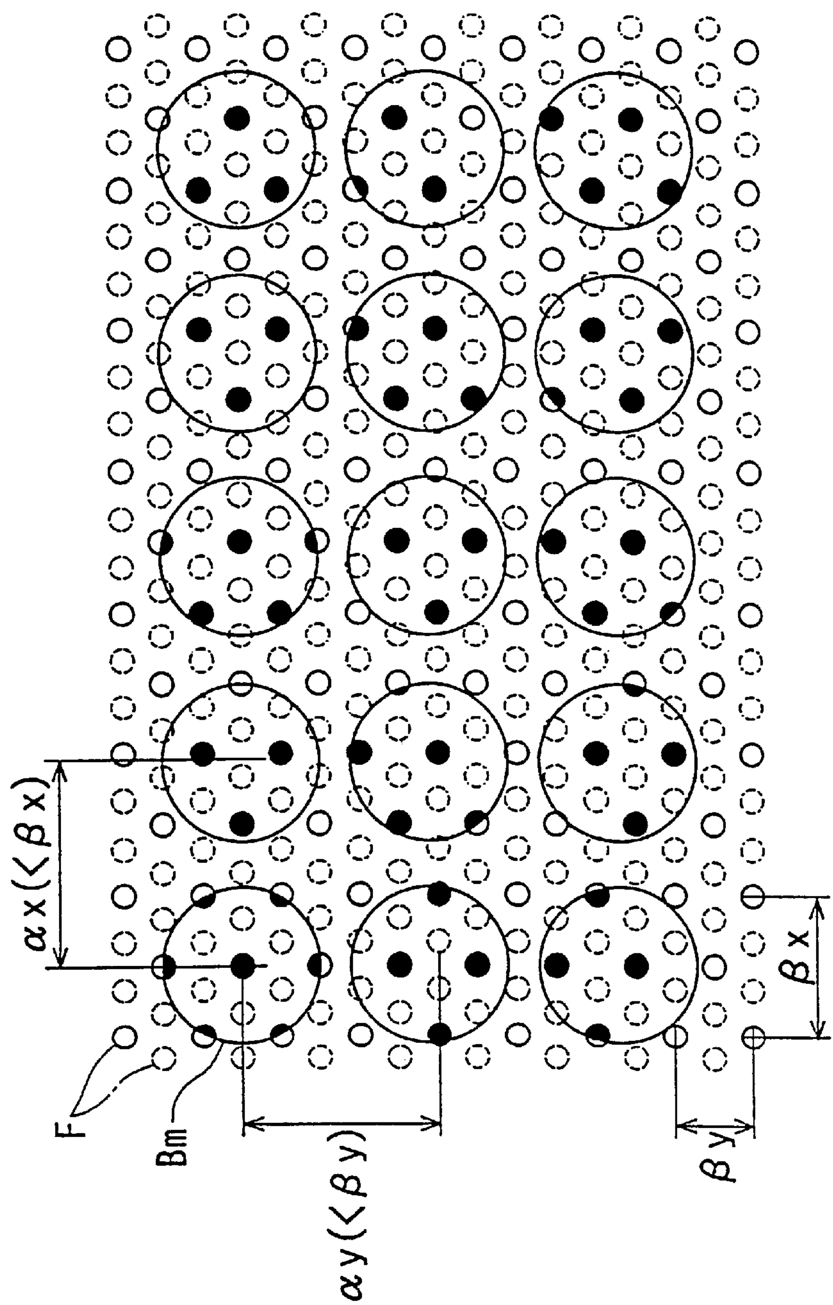
FIG. 18 is a diagram showing a state where the raster size is changed along both horizontal and vertical directions from the state shown in FIG. 17.
Figure 19:
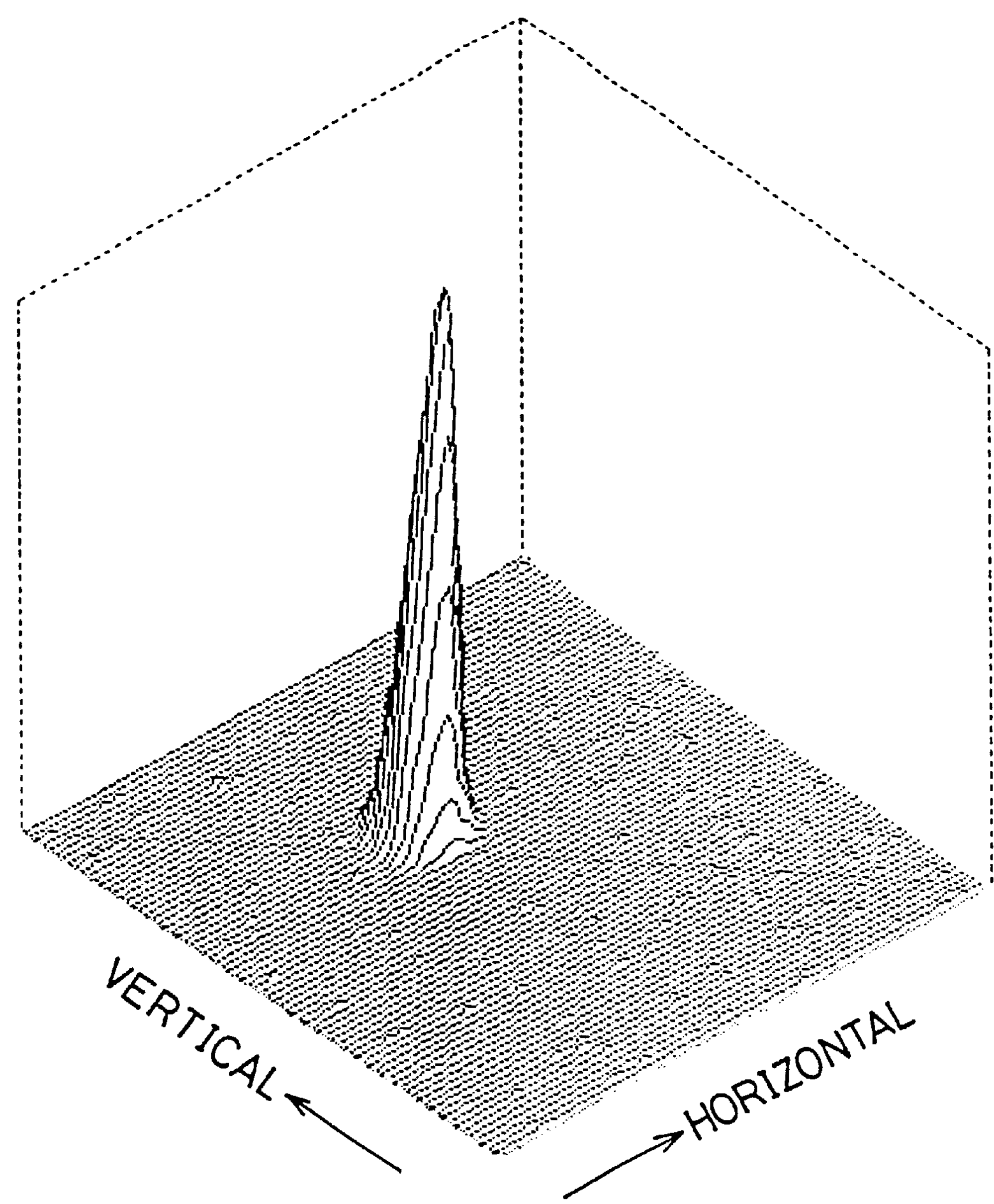
FIG. 19 is a diagram showing an example of solid representation of the measured profile of the electron beam.

FIG. 18 partially shows the state of the test pattern of FIG. 17 when the raster size is changed such that $\alpha x=2.89\beta x$, $\alpha y=4.8\beta y$. This test pattern image is picked up by the CCD camera 3, the luminous data of the luminous portions (black portions) of the phosphors and the luminous positions (two-dimensional coordinates) are calculated from the picked image, and the luminous data are combined in the substantially same manner as the case of FIG. 17. In this way, the three-dimensional profile of the electron beam can be measured. The measurement result is displayed in the display device 53 of the measurement controller in a three-dimensional manner.

Although the luminous efficiency is corrected to improve the measurement accuracy in the foregoing embodiment, this correction may be eliminated to easily perform a high speed measurement.

Next, a second embodiment of the present invention will be described with reference to FIGS. 20 to 24. In this embodiment, a plurality of line patterns are displayed such that stripe patterns of phosphors differ as shown in FIG. 22. A density distribution of electron energy in the widthwise direction of the lines is measured by picking up images of the plurality of displayed line patterns and combining the picked images.

Figure 20:
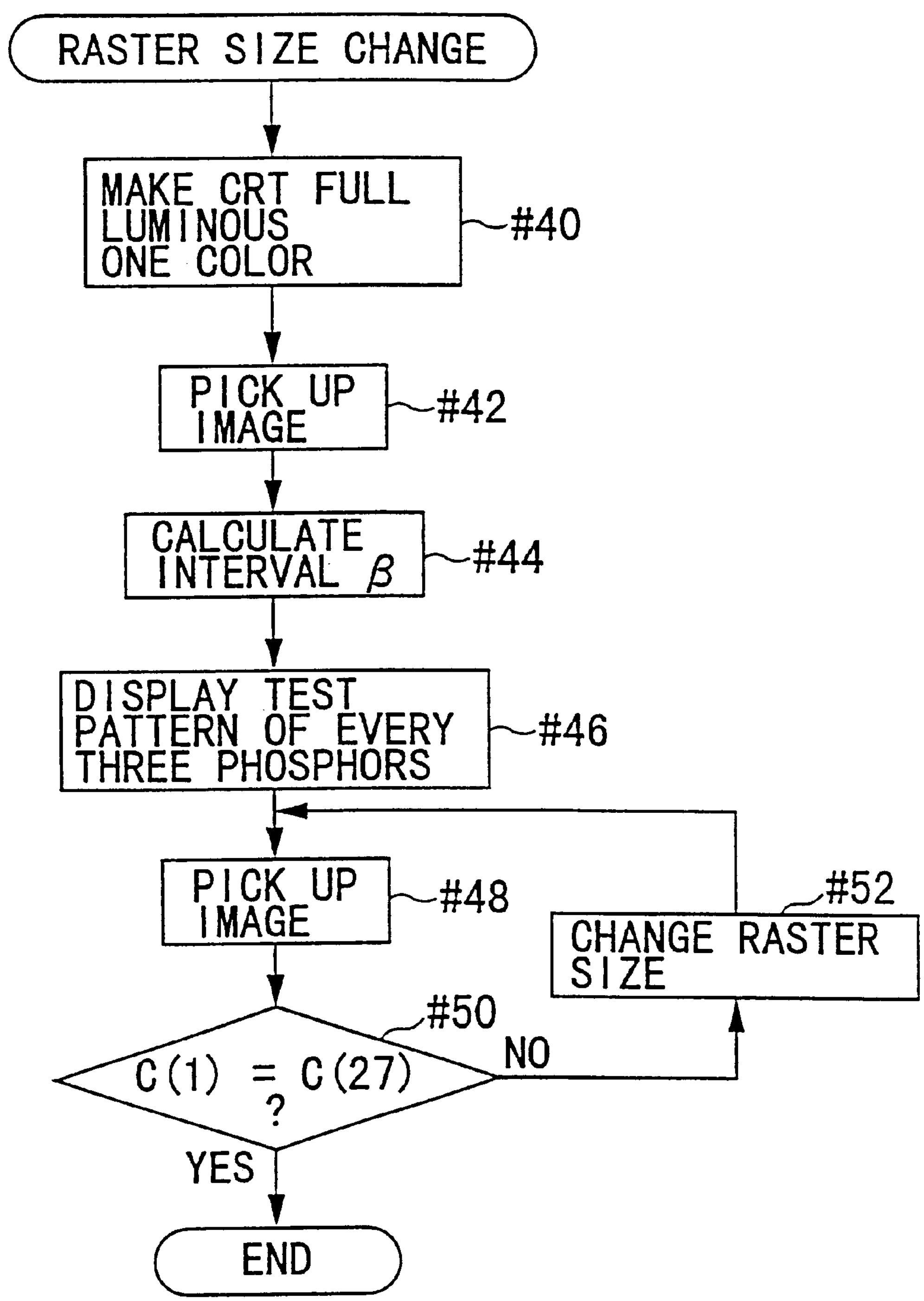
FIG. 20 is a flowchart showing a processing of changing a raster size according to a second embodiment of the present invention.
Figure 21:
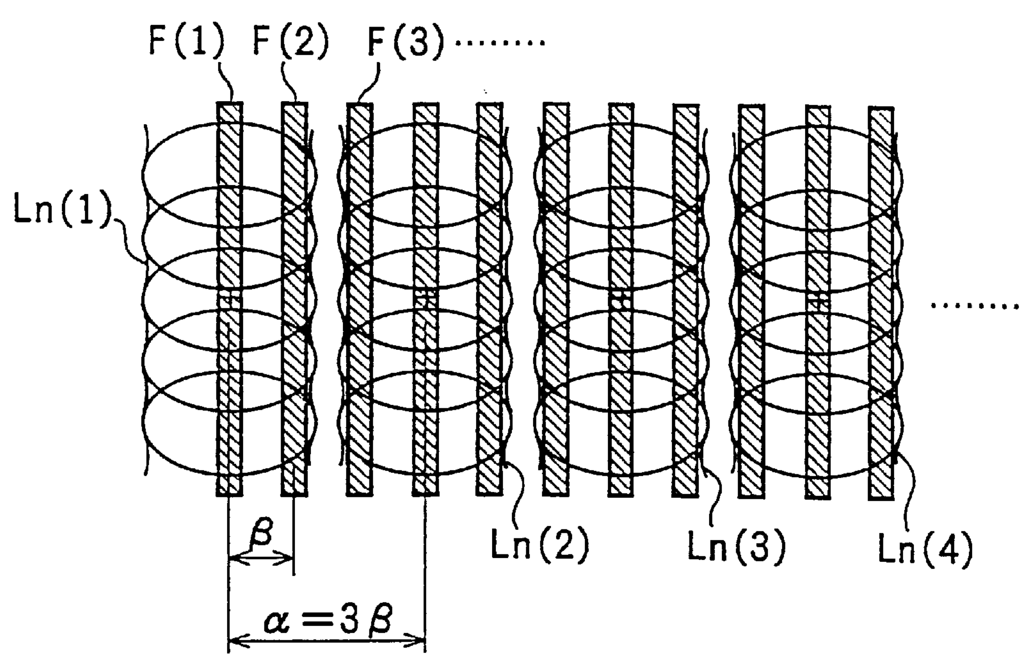
FIG. 21 is a diagram showing a state where electron beams are discretely projected at intervals of three lines along horizontal direction in a color CRT to produce a plurality of vertical lines on a display surface of the color CRT.

FIG. 20 is a flowchart showing a processing of changing a raster size. Steps #40 to #44 are basically identical to Steps #20 to #24 of FIG. 10. Specifically, the interval $\beta$ between phosphors is calculated based on image data which is obtained by picking up an image of the entire display surface of a color CRT 6.

Thereafter, in Step #46, a display on the color CRT 6 obtained by making the phosphors fully luminous in a single color is changed to an image of a test pattern obtained by discretely projecting electron beams at an interval of three phosphors along horizontal direction. To discretely project the electron beams every three phosphors means to discretely project the vertical lines Ln(1), Ln(2), . . . onto the phosphors F(1), F(4), . . . F(2r+1) (r=0, 1, . . . ) arranged every three phosphors. The interval a between lines is: $\alpha=3\beta$, and the center of each vertical line Ln(i) coincides with the center of the illuminated phosphor F(j). Accordingly, the stripe patterns formed by the luminous phosphors included in the respective beams Bm(i) are all identical.

Figure 22A:
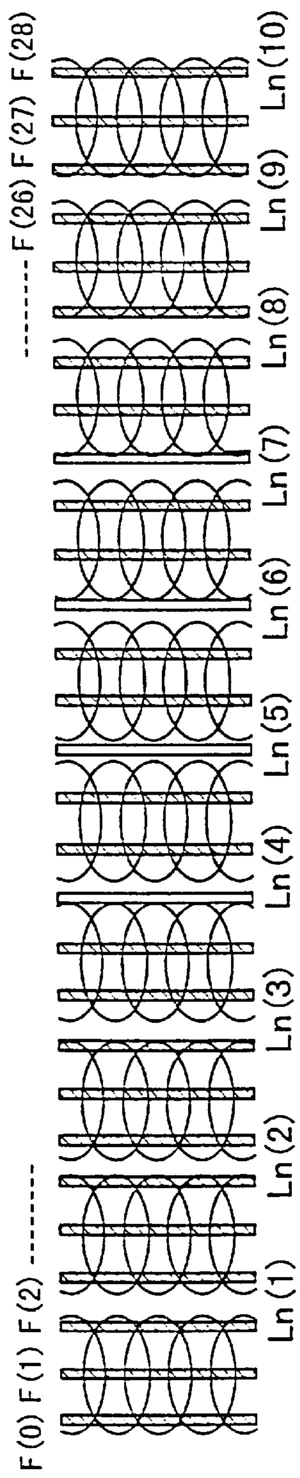

Subsequently, as shown in FIG. 22A, the horizontal raster size is changed so that the stripe pattern obtained by making the phosphors included in a vertical line Ln(1) luminous coincides with the one obtained by making the phosphors included in a vertical line Ln(10) luminous (a loop of Steps #48 to #52). In other words, the horizontal raster size is changed such that there are 9 different kinds of stripe patterns included in the vertical lines.

More specifically, the raster size changing processing is performed as follows. The test pattern image is picked up every field scanning (Step #48). A luminance data C(1) of the phosphor F(1) on which the beam center of the vertical line Ln(1) is projected and a luminance data C(27) of the phosphor F(27) on which the beam center of the vertical line Ln(10) is projected are extracted from the data of this picked images, and these data are compared after being corrected by corresponding correction coefficients $\eta$(Step #50).

If the luminance data C(1) and C(27) are at variance (NO in Step #50), next field scanning is performed by changing the raster size by a predetermined amount (Step #52); the test pattern image is picked up and the luminance data C(1) and C(27) are compared again (Step #50). Hereafter, the raster size is changed while the luminance data C(1) and C(27) are compared, and this processing is completed when the luminance data C(1) and C(27) agree with each other, that is, YES in Step #50.

Figure 22B:
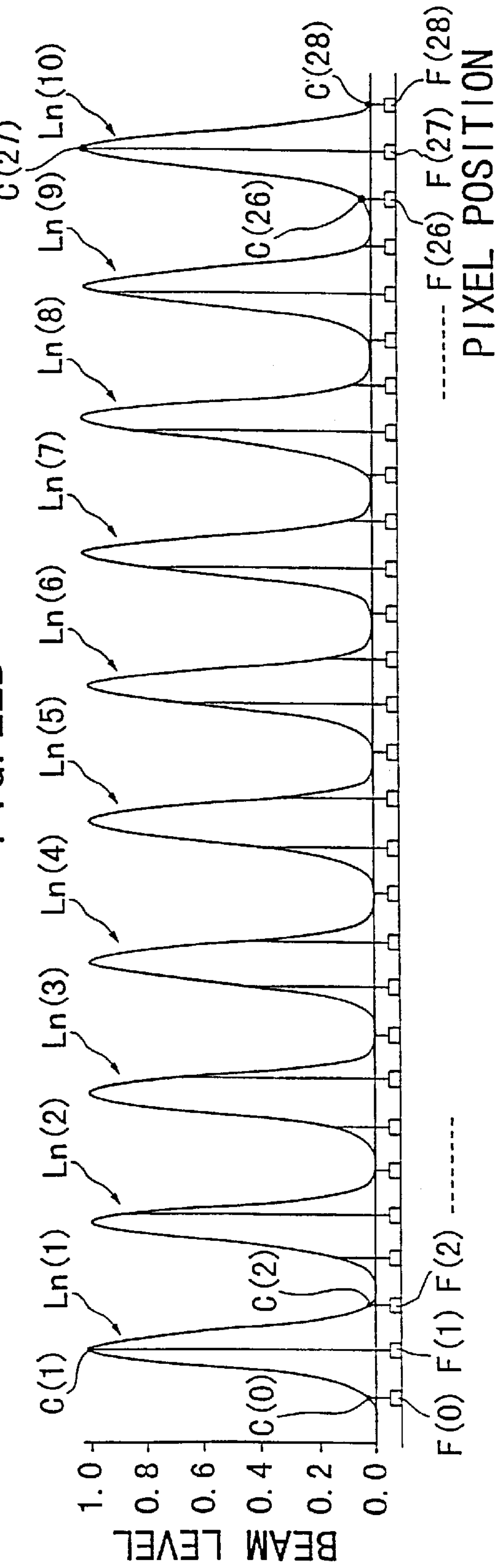

FIG. 22A shows the test pattern displayed on the color CRT 6 when the luminance data C(1) and C(27) agree wit h each other, showing only a portion where the vertical lines Ln(1) to Ln(10) are displayed. Black portions represent luminous portions of the phosphors F(0) to F(28). FIG. 22B shows the luminance data C(0) to C(28) of the luminous positions (luminance centers) of the phosphors F(0) to F(28) in absolute values (normalized values). In the calculation of the luminance data C(0) to C(28), the luminous efficiency are corrected by multiplying the pixel data corresponding to the luminous position by the correction coefficient $\eta$ in this position. Although the luminance data are represented in normalized values in FIG. 22B, normalization may not necessarily be performed in the raster size changing processing.

The line profile measurement will be described. Upon the completion of the raster size changing processing, a test pattern image shown in FIG. 22A is displayed on the color CRT 6. This test pattern may be displayed on the area of the color CRT 6 that corresponds to the entire sensing area of the CCD camera 3. Alternatively, the test pattern may be displayed to produce a necessary number of lines for measurement.

Figure 24:
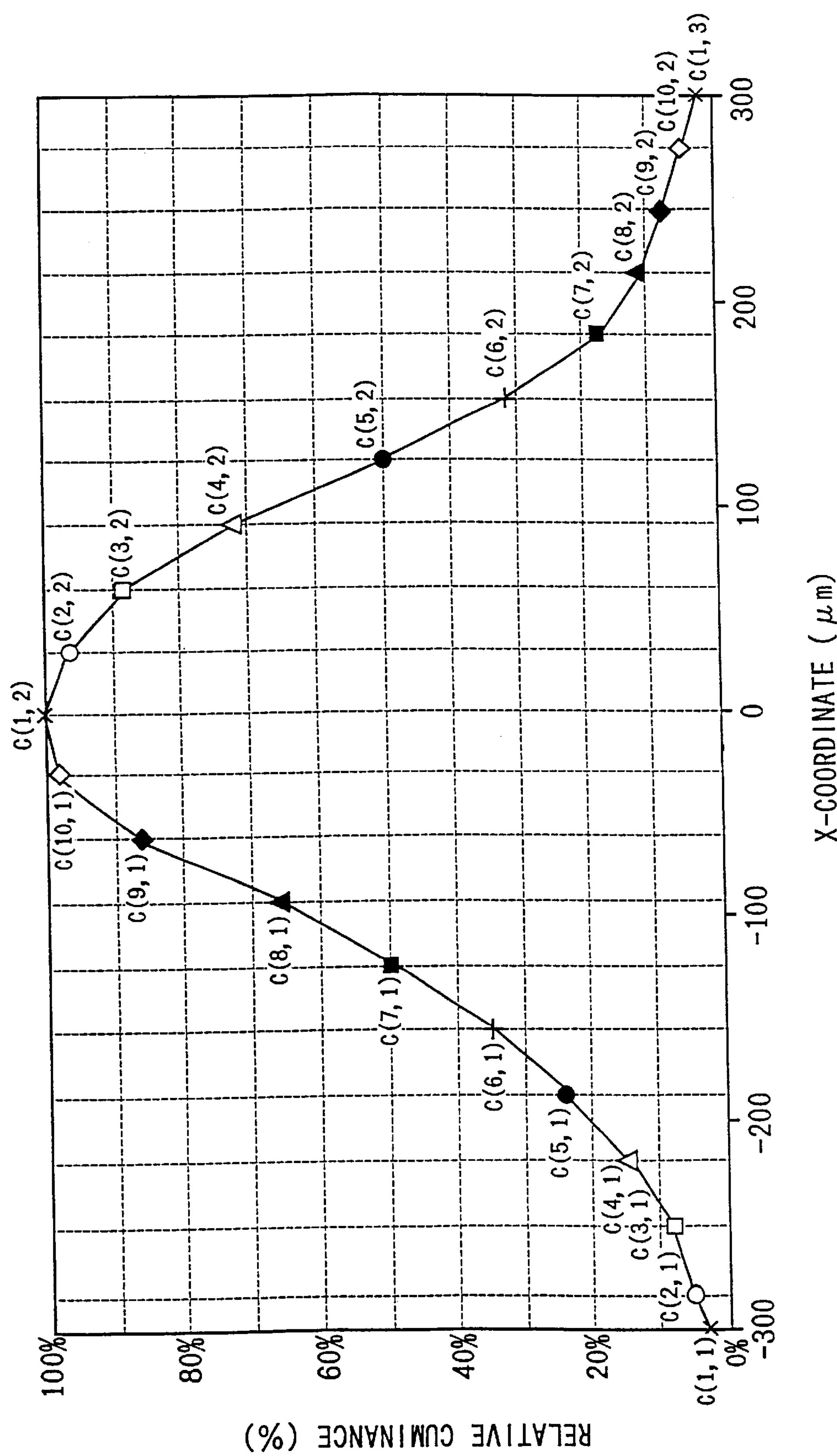
FIG. 24 shows a measurement data representing the line profile which is obtained by combining the luminance data C(1,1) to C(10,2) shown in FIG. 23.

This test pattern image is picked up by the CCD camera 3, and the luminance data C(0) to C(26) in the luminous positions of the respective phosphors F(0) to F(26) shown in FIG. 22B are calculated from the data of the picked image. By combining the luminance data C(0) to C(26), a measurement data representing the profile of the vertical line shown in FIG. 24 is calculated.

The luminance data C(0) to C(26) are combined by rearranging them in the luminous positions (X-coordinates) along the widthwise direction of the vertical lines. This combination processing may be performed by the data input controller 2 or by the measurement controller 5.

Since the width of each vertical line are such that maximum three phosphors can be made luminous thereby, groups of three luminance data C(h)(h=0, 1, . . . 28) are corresponded to the vertical line Ln(i)(i=1, 2, . . . 9). If the three luminance data corresponding to the vertical line Ln(i) are expressed by C(i, k)(k=1, 2, 3), i, k are determined as follows: i=(an integer of (h/3))+1, k=(h+1)−3(i−1). The luminance data C(h) shown in FIG. 22B are converted into luminance data C(i,k) as shown in FIG. 23.

If the luminous positions in the vertical line Ln(i) of the three luminance data C(i, k)(k=1, 2, 3) corresponding to the vertical line Ln(i) are expressed by X-coordinates $X_{i,k}$, the respective X-coordinates $X_{i,k}$ are: $X_{i,1}=-\beta+\Delta d\cdot(i-1)$, $X_{i,2}=+\Delta d\cdot(i-1)$ and $X_{i,3}=\beta+\Delta d\cdot(i-1)$ in a range between $+2\beta$. If $\Delta d=3\beta-\alpha$ and $\beta=270$ $\mu$m, $\alpha=780$ $\mu$m and $\Delta d=30$ $\mu$m in the example of FIG. 22A.

Accordingly, the measurement data representing the line profile can be calculated by calculating the X-coordinates $X_{i,k}$ in the sections of the beams corresponding to the respective luminance data C(i,k) and plotting the luminance data C(i,k) corresponding to these X-coordinates $X_{i,k}$. This measurement result is displayed in the display device 53 of the measurement controller 5.

Figure 23:
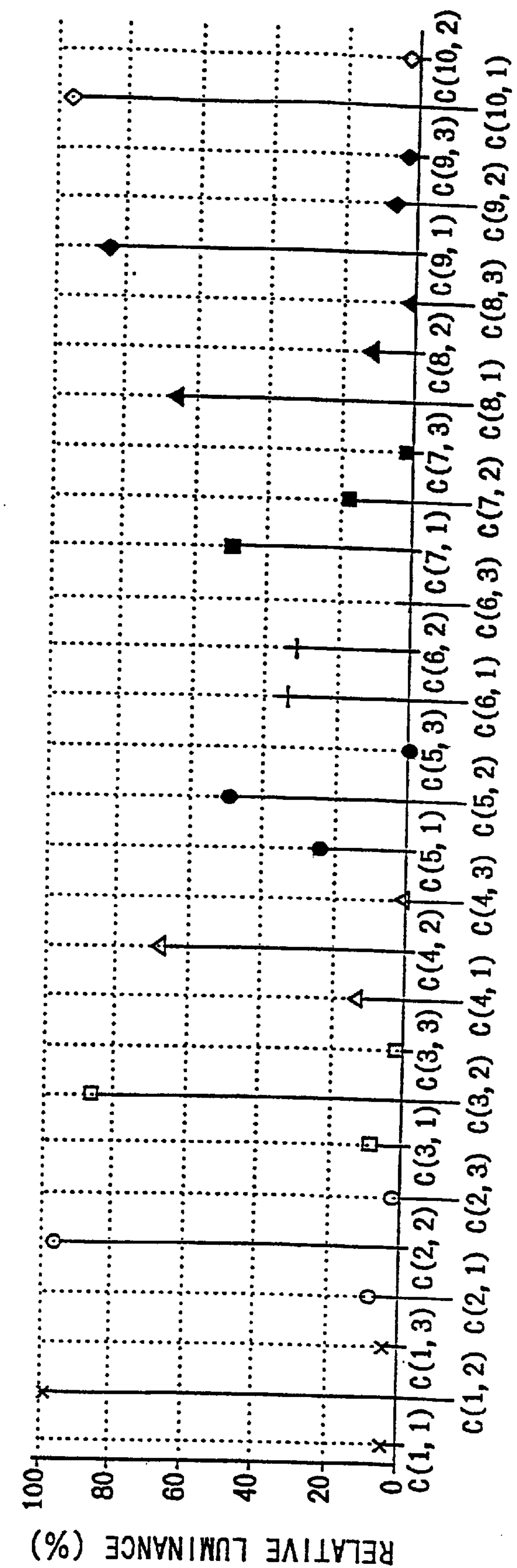
FIG. 23 is a diagram showing luminance data C(1,1) to C(10,2) converted from luminance data C(0) to C(28) at the phosphors shown in FIG. 22B.

FIG. 24 shows a measurement data representing the line profile which is obtained by combining the luminance data C(1,1) to C(10,2) shown in FIG. 23. The resolving power of the measurement data is 30 $\mu$m and the displayed level is a normalized relative level.

It should be noted that the test pattern image for the measurement may be displayed on the entire sensing area of the CCD camera 3 or only the lines necessary as the measurement data may be displayed.

Although the line profile measurement of the color CRT equipped with an aperture grill is described in the second embodiment, the invention is likewise applicable to the line profile measurement of a color CRT equipped with a dot mask.

In the color CRT equipped with an aperture grill, the raster size of the test pattern for the measurement is made changeable only along horizontal direction in the profile measurement of the vertical line since the luminous positions of the phosphors along the widthwise direction of the lines are discrete. However, in the color CRT equipped with a dot mask, the luminous positions of the phosphors along the widthwise direction of the lines are discrete in the line profile measurement of both horizontal and vertical lines. Accordingly, the raster size of the test pattern for the measurement needs to be also changeable along vertical direction in the line profile measurement of the horizontal line.

In the foregoing embodiments, measurement of an electron beam profile of a color CRT is described. However, the present invention may be applicable for measurement of an electron beam profile of a monochrome CRT.

As described above, according to the invention, a specific test pattern is displayed by discretely projecting electron beams at specified intervals to phosphors on the display surface of the color CRT to be measured so that the positional relationships of the phosphors with respect to the electron beams differ between the beams, and the measurement data for displaying the profiles of the electron beams are calculated using the image data obtained by picking up this test pattern image. Accordingly, a time required to obtain the data used to calculate measurement data can be considerably shortened, thereby enabling a high speed measurement.

Further, since all data necessary for the calculation of the beam profile measurement can be obtained by one image pickup operation, the data can be obtained without being affected by vibrations or the like during the measurement. As a result, highly reliable data can be stably obtained.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An apparatus for measuring a profile of an electron beam of a CRT, the apparatus comprising:

a test pattern signal generator which generates a signal which controls an electron gun device of a CRT to produce a test pattern having a plurality of separate luminous images on a fluorescent surface of the CRT, positions of phosphors defining one luminous image being relatively different from those of phosphors defining another luminous image;

an image pickup device which picks up the plurality of separate luminous images in a single pickup operation to output pixel data in accordance with a luminance of phosphors defining each luminous image;

a relative position calculator which calculates respective relative positions of phosphors defining each luminous image; and a beam profile calculator which calculates a profile of an electron beam of the CRT based on outputted pixel data and calculated relative positions.

2. An apparatus according to claim 1, wherein the relative position calculator calculates relative positions of phosphors defining each luminous image based on outputted pixel data.

3. An apparatus according to claim 1, wherein the relative position calculator includes an area sensor.

4. An apparatus according to claim 1, further comprising a display unit which displays a calculated profile of an electron beam of the CRT.

5. An apparatus according to claim 1, wherein the beam profile calculator combines pixel data at phosphors defining one luminous image and those at phosphors defining another luminous image with reference to their respective phosphor positions to calculate the profile of an electron beam of the CRT.

6. An apparatus according to claim 5, wherein the pixel data is combined so that pixel data from one luminous image is interleaved with pixel data from another luminous image.

7. An apparatus according to claim 1, wherein the luminous image is in the form of a line, the image being produced by a plurality of electron beam projections.

8. An apparatus according to claim 7, wherein the beam profile calculator calculates a profile of an electron beam of the CRT in a widthwise direction of a line image.

9. An apparatus according to claim 1, further comprising a corrector which calculates a correction coefficient to correct luminous efficiency of a phosphor, and corrects outputted pixel data based on a calculated correction coefficient.

10. An apparatus according to claim 9, wherein the corrector calculates the correction coefficient based on pixel data which the image pickup device picks up a reference luminous image entirely produced over a predetermined area of the fluorescent surface at a predetermined energy intensity to output in accordance with a luminance of phosphors defining the reference luminous image.

11. An apparatus according to claim 10, wherein the reference luminous image is produced by shifting the start of raster scanning in a vertical direction by an interval shorter than the raster scanning interval.

12. An apparatus according to claim 1, wherein the test pattern generator includes a raster size changer which changes the size of raster to change relative positions of phosphors defining the plurality of separate luminous images.

13. An apparatus according to claim 12, wherein the test pattern generator includes a test pattern signal generating portion which generates a test pattern signal, and the raster size changer includes a delay circuit which delays the test pattern signal generated by the test pattern signal generating portion.

14. An apparatus according to claim 7, wherein the raster size change amount of the raster size changer is in accordance with a phosphor interval and a given number of measurement points, the phosphor interval being calculated based on pixel data which the image pickup device picks up a reference luminous image entirely produced over a predetermined area of the fluorescent surface at a predetermined energy intensity to output in accordance with a luminance of phosphors defining the reference luminous image.

15. An apparatus according to claim 1, wherein the CRT is a color CRT.

16. An apparatus according to claim 15, wherein the color CRT includes an aperture grill type shadow mask.

17. An apparatus according to claim 15, wherein the color CRT includes a dot mask type shadow mask.

18. An apparatus according to claim 1, wherein the luminous image is in the form of a spot, the image being produced by a single electron beam projection.

19. An apparatus according to claim 15, wherein the beam profile calculator calculates a three-dimensional profile of an electron beam of the CRT.

20. An apparatus according to claim 19, further comprising a display unit displays a calculated three-dimensional profile.

21. An apparatus for evaluating a performance of a CRT, the apparatus comprising:

a test pattern signal generator which generates a signal which controls an electron gun device of a CRT to produce a test pattern having a plurality of separate luminous images on a fluorescent surface of the CRT, positions of phosphors defining one luminous image being relatively different from those of phosphors defining another luminous image;

an image pickup device which picks up the plurality of separate luminous images in a single pickup operation to output pixel data in accordance with a luminance of phosphors defining each luminous image;

a relative position calculator which calculates respective relative positions of phosphors defining each luminous image; and a calculator which calculates an energy density distribution of an electron beam of the CRT based on outputted pixel data and calculated relative positions.

22. An apparatus according to claim 21, wherein the relative position calculator calculates relative positions of phosphors defining each luminous image based on outputted pixel data.

23. An apparatus according to claim 21, wherein the luminous image is in the form of a spot, the image being produced by a single electron beam projection.

24. An apparatus according to claim 21, wherein the luminous image is in the form of a line, the image being produced by a plurality of electron beam projections.

25. An apparatus according to claim 21, further comprising a corrector which calculates a correction coefficient to correct luminous efficiency of a phosphor, and corrects outputted pixel data based on a calculated correction coefficient.

26. An apparatus according to claim 21, wherein the test pattern generator includes a raster size changer which changes the size of raster to change relative positions of phosphors defining the plurality of separate luminous images.

27. An apparatus according to claim 21, further comprising a display unit which displays a calculated energy density distribution of an electron beam of the CRT.

28. An apparatus according to claim 21, wherein an energy density distribution is a distribution of relative luminances of phosphors.

29. An apparatus according to claim 21, wherein the calculator combines pixel data at phosphors defining one luminous image and those at phosphors defining another luminous image with reference to their respective phosphor positions to calculate the energy density distribution of an electron beam of the CRT.

30. An apparatus according to claim 29, wherein the pixel data is combined so that pixel data from one luminous image is interleaved with pixel data from another luminous image.

31. An apparatus according to claim 21, wherein the CRT is a color CRT.

32. An apparatus according to claim 31, wherein the color CRT includes an aperture grill type shadow mask.

33. An apparatus according to claim 31, wherein the color CRT includes a dot mask type shadow mask.

34. A method for measuring a profile of an electron beam of a CRT, the method comprising the steps:

producing a test pattern having a plurality of separate luminous images on a fluorescent surface of a CRT, positions of phosphors defining one luminous image being relatively different from those of phosphors defining another luminous image;

picking up the plurality of separate luminous images in a single pickup operation to generate pixel data in accordance with a luminance of phosphors defining each luminous image;

calculating respective relative positions of phosphors defining each luminous image; and calculating a profile of an electron beam of the CRT based on generated pixel data and calculated relative positions.

35. A method according to claim 34, wherein relative positions of phosphors defining each luminous image are calculated based on generated pixel data.

36. A method according to claim 34, further comprising the steps of:

calculating a correction coefficient to correct luminous efficiency of a phosphor; and correcting generated pixel data based on a calculated correction coefficient.

37. A method according to claim 34, further comprising the step of displaying a calculated profile of an electron beam of the CRT.

38. A method for evaluating a performance of a CRT, the method comprising the steps of:

producing a test pattern having a plurality of separate luminous images on a fluorescent surface of the CRT, positions of phosphors defining one luminous image being relatively different from those of phosphors defining another luminous image;

picking up the plurality of separate luminous images in a single pickup operation to generate pixel data in accordance with a luminance of phosphors defining each luminous image;

calculating respective relative positions of phosphors defining each luminous image; and calculating an energy density distribution of an electron beam of the CRT based on generated pixel data and calculated relative positions.

39. A method according to claim 38, wherein the luminous image is in the form of a spot, the image being produced by a single electron beam projection.

40. A method according to claim 38, wherein the luminous image is in the form of a line, the image being produced by a plurality of electron beam projections.

* * * * *